(12) United States Patent
Takahashi et al.

(10) Patent No.: US 6,275,518 B1
(45) Date of Patent: Aug. 14, 2001

(54) FREQUENCY HOPPING RADIO LAN SYSTEM AND FREQUENCY HOPPING CONTROL METHOD

(75) Inventors: Yasuhiro Takahashi, Kawasaki; Takeshi Kondou, Fujisawa; Susumu Matsui, Machida, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 08/589,650

(22) Filed: Jan. 22, 1996

(30) Foreign Application Priority Data

Jan. 27, 1995 (JP) .................................................... 7-031418

(51) Int. Cl.[7] ............................ H04B 7/216; H04B 1/713
(52) U.S. Cl. ........................ 375/135; 375/132; 370/321; 455/436
(58) Field of Search ................................. 342/450, 455, 342/456; 370/321, 322, 324, 331, 341, 343, 524; 375/132–135, 138; 455/31.2, 63, 436, 447, 450, 501–502

(56) References Cited

U.S. PATENT DOCUMENTS

| | | | |
|---|---|---|---|
| 4,554,668 | * | 11/1985 | Deman et al. ........................ 375/133 |
| 4,850,036 | * | 7/1989 | Smith .................................... 455/502 |
| 5,394,433 | * | 2/1995 | Bantz et al. .......................... 375/132 |
| 5,537,434 | * | 7/1996 | Persson et al. ....................... 375/202 |
| 5,581,548 | * | 12/1996 | Ugland et al. ........................ 370/330 |
| 5,638,361 | * | 6/1997 | Ohlson et al. ........................ 375/202 |
| 5,638,399 | * | 6/1997 | Schuchman et al. ................. 370/324 |
| 5,659,573 | * | 8/1997 | Bruckert et al. ..................... 375/200 |
| 5,668,828 | * | 9/1997 | Sanderford, Jr. et al. ........... 375/202 |
| 5,784,368 | * | 7/1998 | Weigand et al. ..................... 370/350 |
| 6,014,406 | * | 1/2000 | Shida et al. .......................... 375/133 |
| 6,031,863 | * | 2/2000 | Jusa et al. ............................. 375/132 |
| 6,061,389 | * | 5/2000 | Ishifuji et al. ....................... 375/133 |
| 6,128,328 | * | 10/2000 | Schilling .............................. 375/134 |

FOREIGN PATENT DOCUMENTS 715443   1/1995  (JP) ............................... H04L/12/28

OTHER PUBLICATIONS

Yukiji Yamauchi, "Digital Mobil Communication System", Tokyo Electric University Press pp. 98–101.

* cited by examiner

Primary Examiner—Young T. Tse
(74) Attorney, Agent, or Firm—Antonelli, Terry, Stout & Kraus, LLP

(57) ABSTRACT

A radio LAN system based on a frequency hopping control scheme in which a deviation between frequency hopping timing in a cell and frequency hopping timing in another cell is measured, and as the deviation increases close to such a degree that causes interference, a frequency hopping pattern currently used in the cell is replaced with another frequency hopping pattern, or the order on the frequency hopping pattern is changed to avoid interference between the cells.

41 Claims, 16 Drawing Sheets

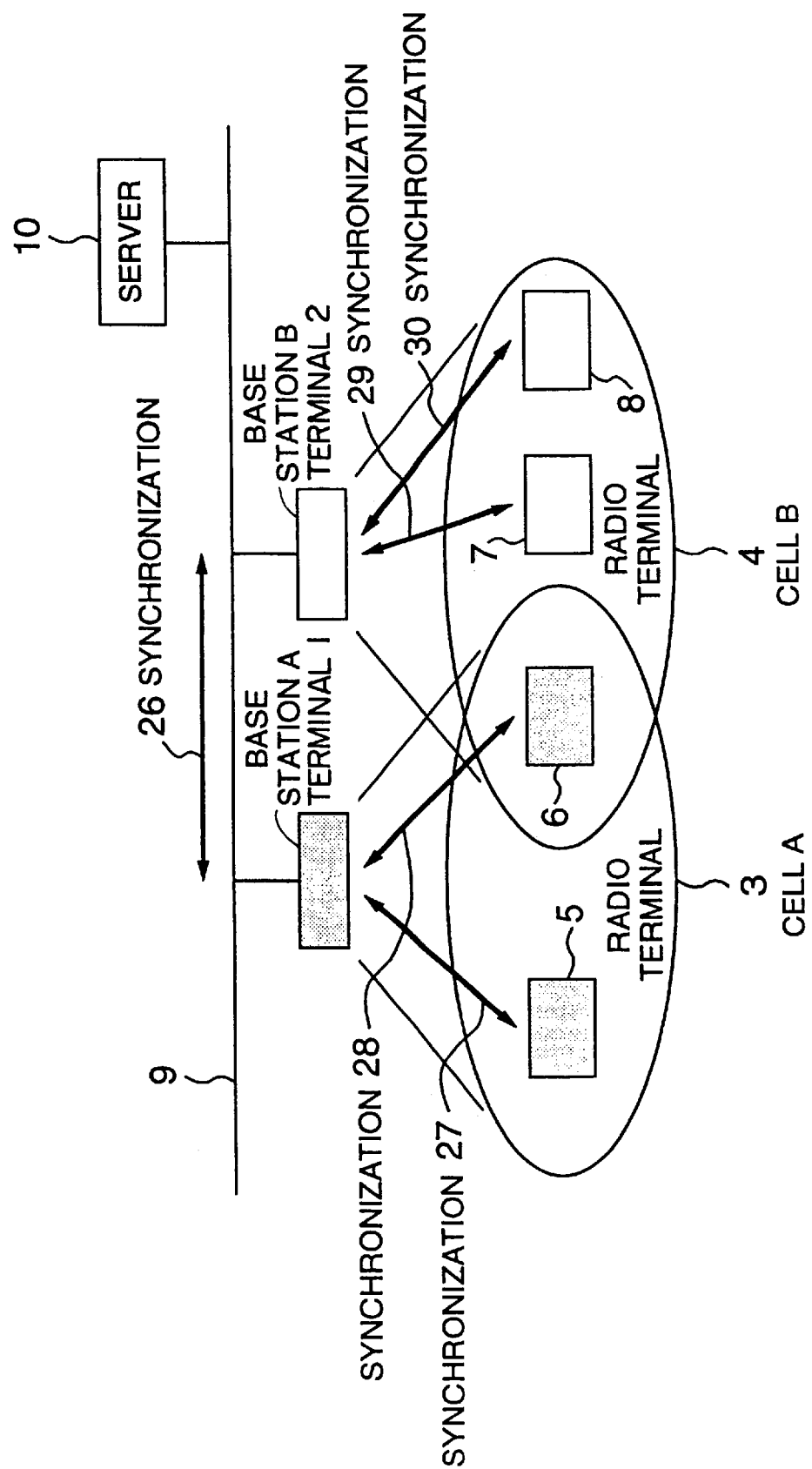

FREQUENCY HOPPING RADIO LAN SYSTEM AND FREQUENCY HOPPING CONTROL METHOD

BACKGROUND OF THE INVENTION

The present invention relates to a frequency-hopping radio LAN (local area network) system, and more particularly to a radio LAN system which prevents overlapping cells from concurrently hopping to the same frequencies to avoid interference.

The frequency hopping is one of spread spectrum communication schemes, and more specifically changes frequencies over time at which information is communicated. In a conventional frequency hopping system, as shown in literature entitled "Digital Mobile Communication System" (pp 98–101, written by Yukiji Yamauchi and published by Tokyo Electric University Press), a hopping pattern for changing frequencies used at regular time intervals is generated by a hopping pattern generator provided in each of a transmitter and a receiver. A frequency synthesizer is controlled by instructions from the generator to change transmitted and received frequencies at regular time intervals.

The hopping pattern generator in the transmitter side generates a substantially random sequence of frequency values which are used to determine the order of hopping frequencies so as to transmit radio waves at the hopping frequencies in the determined order. In order to provide the hopping frequencies in the same order on the receiver side, the receiver side uses a hopping pattern generator for generating the same sequence as that generated on the transmitter side. It should be noted that the hopping pattern is made on the assumption that it is not changed during communications.

In an environment including a plurality of radio base stations such as a multi-cell environment, the possibility of concurrent use of the same frequency is reduced by taking advantage of a random nature of the hopping pattern. However, this reduced possibility is provided only on condition that a very wide band is assigned so as to permit the frequency hopping to a large number of frequencies.

However, assuming that a radio LAN system using a 2.4 GHz band is assigned, for example, a limited band width of 26 MHz, if a band of 2 MHz is assigned to each channel for ensuring a data transmission rate of, for example, 2 Mbps, 13 channels are merely available in the band width of 26 MHz.

Thus, as the transmission rate is to be increased, a less number of channels are available for the frequency hopping. Therefore, if a plurality of radio LAN systems randomly hopped to the channels without considering by any means the operations of other radio LAN systems, the possibility of concurrent use of the same frequency would be increased because of an insufficient number of channels available for the frequency hopping.

To solve the problem mentioned above, JP-A-7-15443, whose priority document is U.S. Ser. No. 052,329, filed on Apr. 22, 1993, (now U.S. Pat. No. 5,394,433) discloses a control system for automated management of frequency-hopping in a radio communication network.

The radio communication network management system described in JP-A-7-15443 includes a plurality of radio LAN base stations each accommodating a plurality of radio terminals and a wireless network manager for accommodating the radio LAN base stations. Each of the radio LAN base stations receives a frequency hopping pattern assigned thereto from the wireless network manager, and monitors the radio communication environment therearound to check whether the same hopping pattern is being used by any other base station. If not used, the radio LAN base station starts a communication with the assigned frequency hopping pattern. After starting the communication, the base station always measures the degree of frequency interference and continues to use the same frequency hopping pattern if the degree of the frequency interference is below a predetermined value. However, if frequency interference exceeding the predetermined value is occurring, the base station modifies part of the frequency hopping pattern, and again checks whether the modified pattern is being used by any other base station. If used, the base station receives a new frequency hopping pattern from the wireless network manager. Conversely, if not used, the base station performs the communication using the modified frequency hopping pattern. The wireless network manager has a plurality of prepared frequency hopping patterns and manages information on whether or not each of the frequency hopping patterns is available to a certain base station, depending on whether a particular frequency hopping pattern is currently in use or whether interference is occurring, and so on. During communications, each of the radio LAN base stations monitors for interference, checks interference, if found, to classify it into local interference, continuous interference and burst-type interference, and takes a suitable action in accordance with the classification, which may be hop insertion/deletion, hopping pattern replacement, hop advance, or the like, to avoid the interference.

The disclosed control system has a problem that the action cannot be taken before interference occurs. However, if interference actually occurs, this will result in communication faults and end up with interrupted data transmission and reception. It is therefore necessary to predict whether frequency interference will occur and previously take a suitable action, if frequency interference is predicted, to prevent communication faults. The above-mentioned control system does not provide any solution to the predictive control.

In addition, the prior art control system has another problem as described below. When a radio LAN base station changes a frequency hopping pattern assigned thereto, radio terminals placed under management of the radio LAN base station also need to change the frequency hopping pattern correspondingly. In this case, however, the change of the frequency hopping pattern may cause the synchronization between the radio LAN base station and the radio terminals managed thereby to go off. For again establishing the synchronization therebetween, the communication is interrupted for an increased time period. Also, in this event, since communication faults due to noise, error and so on may prevent some radio terminal from receiving a hopping pattern changing instruction from the base station, the radio terminal is left unknown about the change of the frequency hopping pattern. As is understood from the foregoing, the prior art control system has left unsolved the problems on the maintenance of the synchronization between a radio LAN base station and radio terminals managed thereby due to a change of a frequency hopping pattern, on the prevention of any radio terminal from failing to receive a hopping pattern changing instruction from the base station, and so on.

The prior art control system has a further problem that if a plurality of radio LAN systems operate in the same area, two or more radio LAN systems may concurrently use the same hopping frequency which causes interference, whereby an amount of data corresponding to a band capacity cannot be transferred.

SUMMARY OF THE INVENTION

It is an object of the present invention to provide a frequency-hopping radio LAN system which is capable of preventing the concurrent use of a hopping frequency to avoid mutual interference in an environment in which a plurality of radio LAN systems concurrently operate in the same area or in which a plurality of cells of radio LAN systems lie adjacent to each other or overlap with each other.

More specifically, the present invention is intended to provide solutions for the following problems which the above-mentioned prior art example (JP-A-7-15443) has left unsolved:

1) predicting interference, before the radio LAN system suffers from the interference and communication faults caused thereby, to avoid the interference and prevent interrupted communications;
2) for changing a frequency hopping pattern because of predicted interference, making the change synchronously in a radio base station and radio terminals managed thereby so as to prevent interrupted communications;
3) preventing radio terminals from failing to receive instructions for changing the frequency hopping pattern from the radio base station; and so on.

The present invention is intended to solve the problems mentioned above particularly in an environment where a plurality of frequency hopping radio LAN systems may operate in the same area or a plurality of cells covered by the radio LAN systems are located adjacent to or overlap with each other. Base stations of a plurality of radio LAN systems or base stations in a plurality of cells of radio LAN systems, in synchronism with each other, detect that the same hopping frequency is concurrently being used or is likely to be used by the plurality cells. Upon detecting such a situation, instructions are transmitted to change a frequency hopping pattern or to adjust the phase of the frequency hopping pattern (repeating the same hopping frequency instead of hopping to the next hopping frequency or skipping one hopping frequency to hop to the next but one hopping frequency) so as to avoid the concurrent use of the same frequency in a plurality of cells while maintaining the synchronization between a base station and radio terminals connected thereto in each cell. When an instruction to change a frequency hopping pattern or an instruction to adjust the phase of the frequency hopping pattern is to be issued from a base station, a previous notice may be issued so as to ensure that the instruction is conveyed to all associated radio terminals.

In a radio LAN system based on a frequency hopping spread spectrum communication scheme, wherein a plurality of predetermined radio frequencies are hopped at regular time intervals, and communications are performed at each of the hopping frequencies between radio stations or in a radio cell including a base station and a plurality of subordinate radio terminals connected thereto, a hopping pattern defining the order of radio frequencies is replaced with another hopping pattern from the next hopping timing during communications by an instruction from a radio station to avoid the interference caused in the frequency hopping in different cells while maintaining the communications in progress without losing the synchronization between so far communicating radio stations or between a base station and subordinate radio terminals connected thereto.

Likewise, in the radio LAN system as mentioned above, the frequency hopping pattern may be changed by an instruction from a radio station during communications to repeat the same hopping frequency or to skip one hopping frequency to hop to the next but one hopping frequency at the next hopping timing instead of hopping to the next frequency. In this way, it is also possible to avoid concurrently hopping to the same frequency in different cells while maintaining the communications in progress without losing the synchronization between so far communicating radio stations or between a base station and subordinate radio terminals connected thereto.

For instructing a change of the frequency hopping pattern or a change in the order on the frequency hopping pattern, a radio station or a base station, responsible to issue the change instruction, may previously transmit a change notice indicative of changing timing a plurality of times in order to prevent any radio terminals from failing to receive the change instruction due to interference or communication errors caused by noise inherent in the radio wave.

When a group of radio terminals are moved to another location, a frequency hopping pattern used by this group may possibly match with a frequency pattern used by another radio station already under communication at the destination to cause interference therebetween. According to the present invention, however, if such interference is detected and the two frequency hopping patterns are detected to match with each other, the frequency hopping pattern of the moving group is replaced with another one from previously prepared frequency hopping patterns, whereby the two parties can continue communications independently of each other without mutual interference.

Likewise, when a group of radio terminals are moved to another location, if interference with another radio station under communication is detected and the two frequency hopping patterns are detected to match with each other at the destination, the same hopping frequency is repeated or one hopping frequency is skipped to hop to the next but one hopping frequency, instead of hopping to the next hopping frequency at the next hopping timing within the group, whereby the two parties can continue communications independently of each other without mutual interference by thus shifting the phase of the frequency hopping pattern.

In a system having a plurality of groups each including a plurality of radio stations located in adjacent regions, wherein base stations of the respective groups communicate with each other, use the same frequency hopping pattern for communications between the base station and associated radio stations in the respective groups, and mutually maintain phase differences of the frequency hopping pattern such that the plurality of groups, though located adjacent to each other, can continue communications independently of each other without mutual interference, the base stations and other radio stations are provided with a unit for detecting whether a previously provided phase difference is maintained, and a unit for changing a frequency hopping operation, by an instruction from a radio station, to repeat the same frequency or to skip the next hopping frequency to hop to the next but one hopping frequency, instead of hopping to the next hopping frequency, at the next hopping timing, to provide a phase difference. The provision of these units can solve a problem of synchronization failure between a plurality of radio LAN systems or between a plurality of radio cells due to the use of different clocks in the respective systems or cells, in spite of their attempts to establish the synchronization therebetween, and a problem of lost synchronization which can occur, when the synchronization is to be established through a wired LAN system, due to a delay of arrival or varying arrival time of a data packet containing synchronization information.

As a method of detecting whether a phase difference is maintained, a master base station is selected from a plurality of base stations, and the remaining slave base stations communicate synchronization information with the master base station. Each of the slave base stations is provided with a built-in reference clock synchronized with the master base station and always compares the reference clock with a local clock operating for the slave base station to detect a tendency of a deviation between the two clocks, thus providing a determination as to a reduction in a previously reserved phase difference between the slave base station and the master base station.

As to a method of detecting interference with another radio station already under communication at the destination and the matching of the frequency hopping pattern, if a hopping instruction frame is received from any other communication group than the one to which a particular base station belongs each time frequency hopping is performed at regular time intervals, it can be determined from this that a frequency hopping pattern used by the particular base station is at least partially overlapping with a frequency hopping pattern used by the other radio station already under communication.

The present invention is suitable for use in the case where a large number of radio terminals must be accommodated on a single floor, in the case where a plurality of communication areas, i.e., cells each centered on a different radio base station are located on a single floor in an environment in which a plurality of radio LAN systems must be installed on the single floor due to the limitation of the transfer capability of the radio LAN systems, and particularly for the case where a frequency hopping spread spectrum signalling is employed as a communication scheme to enhance the capacity of accommodating radio terminals and the transfer capability or to deal with a multi-cell environment in which a plurality of cells are located adjacent to or overlapping with each other.

The present invention, as configured in the foregoing manner, has advantages as given below:

(1) In an environment in which a plurality of frequency hopping radio LAN systems operate in the same area or a plurality of cells of radio LAN systems are located adjacent to each other or overlapping with each other, base stations of the plurality of radio LAN systems or base stations in the plurality of cells of the radio LAN systems are connected to each other through a wired LAN such that the synchronization is established therebetween and that the interference of frequency hopping is prevented from occurring in a plurality of cells.

(2) By detecting that the synchronization is nearly lost or by detecting that a deviation between frequency hopping patterns is increased larger than a predetermined value and issuing, responsive to this detection, an instruction to change the frequency hopping pattern or to adjust the phase of the frequency hopping pattern, the same hopping frequency is prevented from being used concurrently by a plurality of cells.

(3) A previous change notice is issued prior to an actual instruction, so that an instruction to change a frequency hopping pattern or an instruction to adjust the phase of the frequency hopping pattern can be reliably conveyed to associated radio terminals.

(4) Even if a moving cell in which radio terminals are communicating overlap with another cell, this overlapping is detected, an a frequency hopping pattern is changed to prevent interference between these cells.

(5) Even if a moving cell in which radio terminals are communicating overlap with another cell, this overlapping is detected, and a frequency hopping pattern is subjected to phase adjustment to prevent interference between these cells.

BRIEF DESCRIPTION OF THE DRAWINGS

FIG. 3 is a diagram for explaining the synchronization between cells and the synchronization between a radio base station and radio terminals in each cell;

DESCRIPTION OF THE PREFERRED EMBODIMENTS

Embodiments of the present invention will hereinafter be described with reference to the accompanying drawings. It should be first noted that the present invention however is not limited to the disclosed embodiments.

Figure 1:
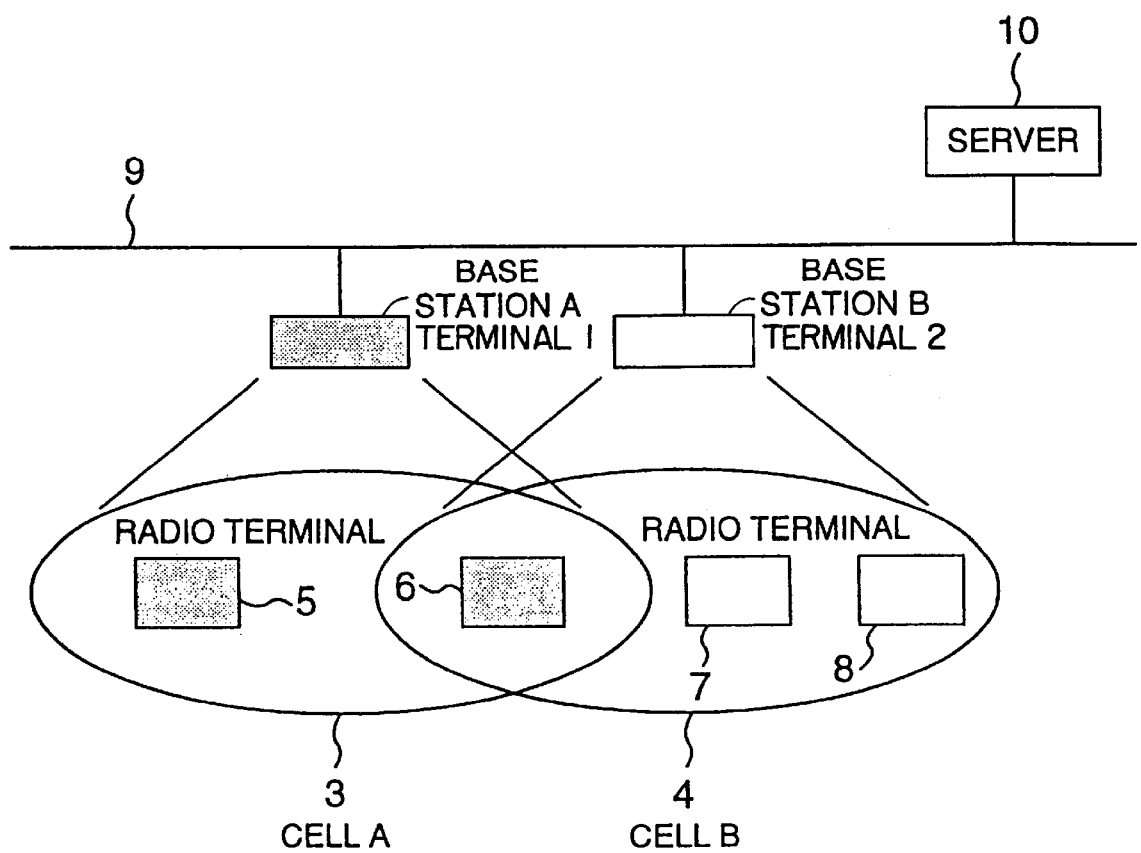
FIG. 1 is a diagram showing a configuration of a frequency-hopping radio LAN system to which the present invention is applied.

FIG. 1 is a diagram showing a system configuration according to an embodiment of the present invention. In the drawing, a radio LAN system includes a radio base station (terminal) A designated by 1 and a radio base station (terminal) B designated by 2. The radio base station (terminal) A (1) has a coverage area 3 represented by a radio cell A, while the radio base station B (2) has a coverage area 4 represented by a radio cell B.

Radio terminals 5–8 are located in the system. More specifically, a radio terminal 5 is staying within the single cell A, and radio terminals 7, 8 are also staying within the single cell B. A radio terminal 6, however, is staying in an overlapping area of the cell A and the cell B, so that the radio terminal 6 may belong to either the base station A or the base station B. However, it is assumed here that the radio terminal 6 belongs to the base station A.

The illustrated radio LAN system also includes a wired LAN 9 to which the base stations A, B (1, 2) are connected. The base stations A, B can communicate with each other or communicate with a server 10 through the wired LAN 9.

In the illustrated embodiment, the two cells A, B have the overlapping area in which the radio terminal 6 is staying. While the radio terminal 6 belongs to the base station A (1), it is also included in the coverage area of the base station B (2). This means that the radio terminal 6 lies within a range in which radio waves from the base station B (2) may reach. Thus, it is necessary to set the radio terminal 6 in an operation mode which forces the radio terminal 6 to receive only radio waves from the base station A and refuse to receive (or recognize) radio waves from the base station B, even if they reach the radio terminal 6. Particularly, in a system employing the frequency hopping as a communication scheme, the base stations A, B must operate in synchronism with each other such that they will not concurrently use the same hopping frequencies at which they communicate with associated radio terminals in the respective cells.

Figure 2A:
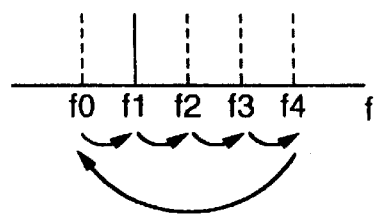
FIGS. 2A, 2B are diagrams for explaining frequency hopping and a deviation of hopping timing between cells.
Figure 2B:
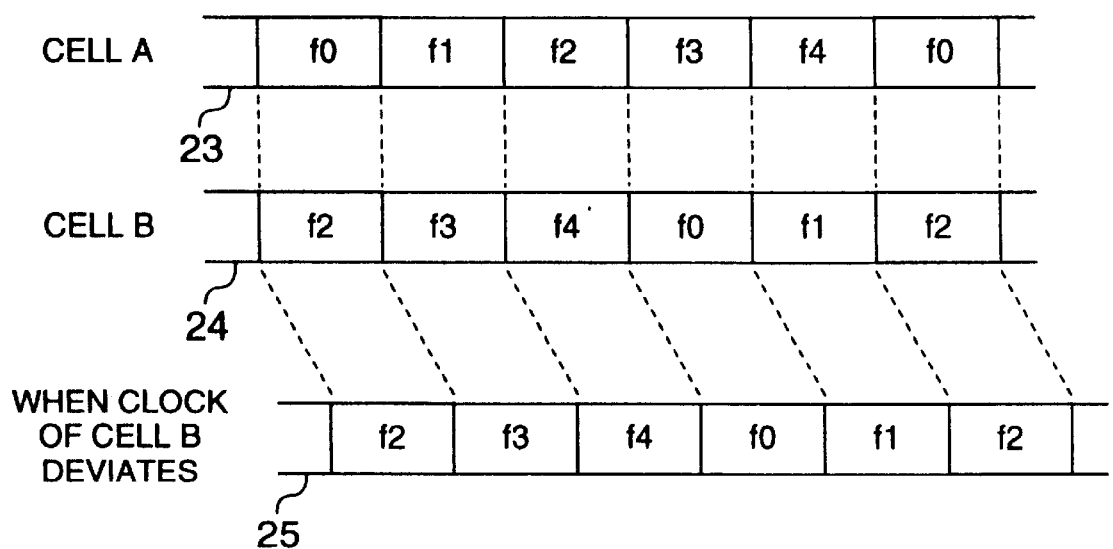

FIGS. 2A, 2B conceptually show how the frequency hopping is performed and how frequency hopping patterns deviate gradually between two cells. As a simple example of the frequency hopping, assume that five frequencies f0, f1, f2, f3, f4 are hopped in the order indicated by the arrows, as shown in FIG. 2A.

In the environment shown in FIG. 1, where the two cells A, B have an overlapping area, each of the cells may be assigned the same hopping pattern for performing the frequency hopping in the order of f0→f1→f2→f3→f4→f0 . . . , as shown in FIG. 2A. In this case, if the frequency hopping pattern is used with a time difference so as to assign different frequencies from each other at a time in the two cells, it is possible to avoid the concurrent assignment of the same frequency and therefore prevent interference between these cells. Stated another way, if the frequency hopping pattern is used constantly with a regular time difference in the two cells A, B in synchronism with each other such that the base station A performs the frequency hopping in accordance with a frequency hopping mode 23 different from a frequency hopping mode 24 of the base station B, the base stations A, B and their associated radio terminals can coexist in the radio LAN system even in an environment in which their cells partially overlap.

However, since the base stations A, B in the cells A, B uses different clocks, they are not always operating in synchronism with each other. For example, it is often the case that, as shown by a frequency hopping pattern 25 in FIG. 2B, a clock used in the base station B may increasingly shift, so that the time difference with which the base stations A, B perform the respective frequency hopping is gradually narrowed in the meantime, resulting in the same hopping frequency concurrently assigned in the two cells A, B. Stated another way, if the synchronization between the cells A, B is lost, the same frequency may be concurrently assigned in the two cells A, B, causing interference therebetween.

As a solution for preventing the interference, a method of establishing the synchronization between the base station and radio terminals associated therewith may be thought.

FIG. 3 shows how to establish the synchronization between a radio base station A having a cell A as its coverage area and a radio base station B having a cell B as its coverage area as well as the synchronization between the radio base station A and radio terminals associated therewith and between the radio base station B and radio terminals associated therewith.

The radio base stations must be synchronized with each other as indicated by arrows 26 so as not to assign the same hopping frequency, in consideration of the two cells possibly overlapping with each other. Also, in order to maintain continuous communications, the base station must remain synchronized with the associated radio terminals as indicated by arrows 27–30.

A problem involved in the synchronization is that even if the synchronization is lost between the cells A and B, they cannot be forced to be re-synchronized. This is because the radio base station is in synchronism with the associated radio terminals in each cell. Thus, if the base station B in the cell B is forced to adjust its clock in order to correct a phase shift between the cells A and B, the synchronization so far maintained between the radio base station B and the associated radio terminals in the cell B will come off due to the clock adjustment, whereby the radio base station B will have to again establish the synchronization with the associated radio terminals.

To solve the above-mentioned problem, this embodiment re-establish the synchronization between the base stations while maintaining the base station in synchronism with the associated radio terminals in each cell.

Figure 4:
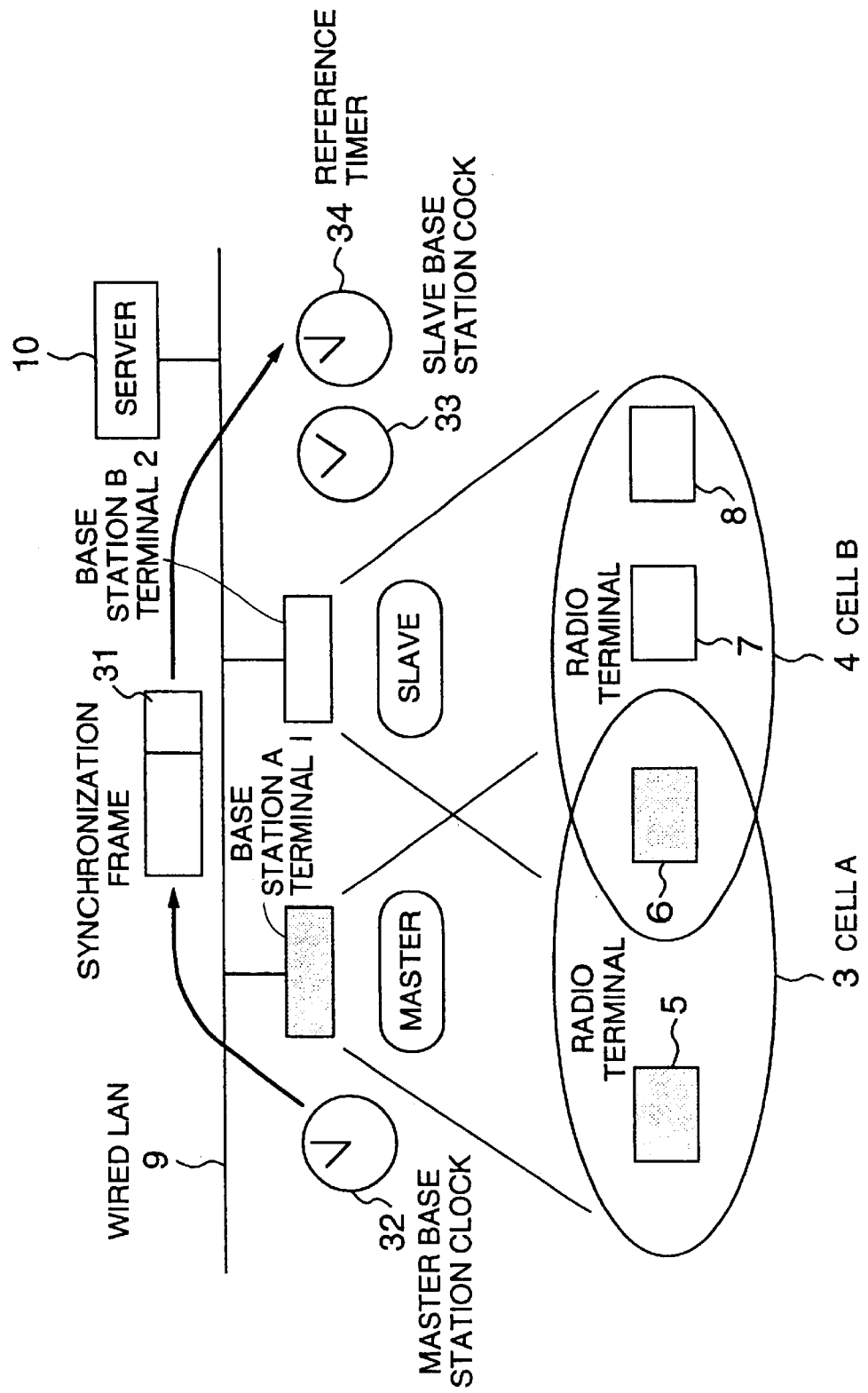
FIG. 4 is a diagram showing an embodiment of the present invention for establishing the synchronization between base stations.

FIG. 4 shows how base stations communicate synchronization information to each other in order to establish the synchronization therebetween in this embodiment. Referring specifically to FIG. 4, a base station A designated by 1 and a base station B designated by 2 communicate a synchronization frame 31 to each other. It should be noted that if there are a plurality of base stations, generally, one is assigned as a master and the others act as slaves which depend on the master. In the illustrated example, the base station A is assumed to be a master.

Each base station has its own clock operating independently of the remaining base stations. Specifically, in FIG. 4, the base station A is provided with a master base station clock 32, while the base station B with a slave base station clock 33. The base station A and radio terminals in the cell A belonging to the base station A operate in synchronism with the clock 32. Likewise, the base station B and radio terminals in the cell B belonging to the base station B operate in synchronism with the clock 33.

The slave base station is also provided with a reference timer 34 which operates in response to the operation of the master base station clock provided in the master base station. The master base station A broadcasts the synchronization frame 31 to other slave base stations at regular intervals in synchronism with the master base station clock 32. Each of the slave base stations resets the reference timer 34 every time it receives the synchronization frame 31. In this way, the reference timer 34 in each slave base station operates in synchronism with the master base station clock 32. Since the slave base station is aware of the operation of the master base station, it can detect possible operational inconsistencies between the master base station and itself.

FIGS. 5A, 5B, 6A and 6B show a deviation correcting procedure which is executed when a slave base station detects that its clock deviates from the clock of the master base station. Specifically, this procedure changes a frequency hopping pattern for re-establishing the synchronization between the slave base station and the master base station.

Figure 5A:
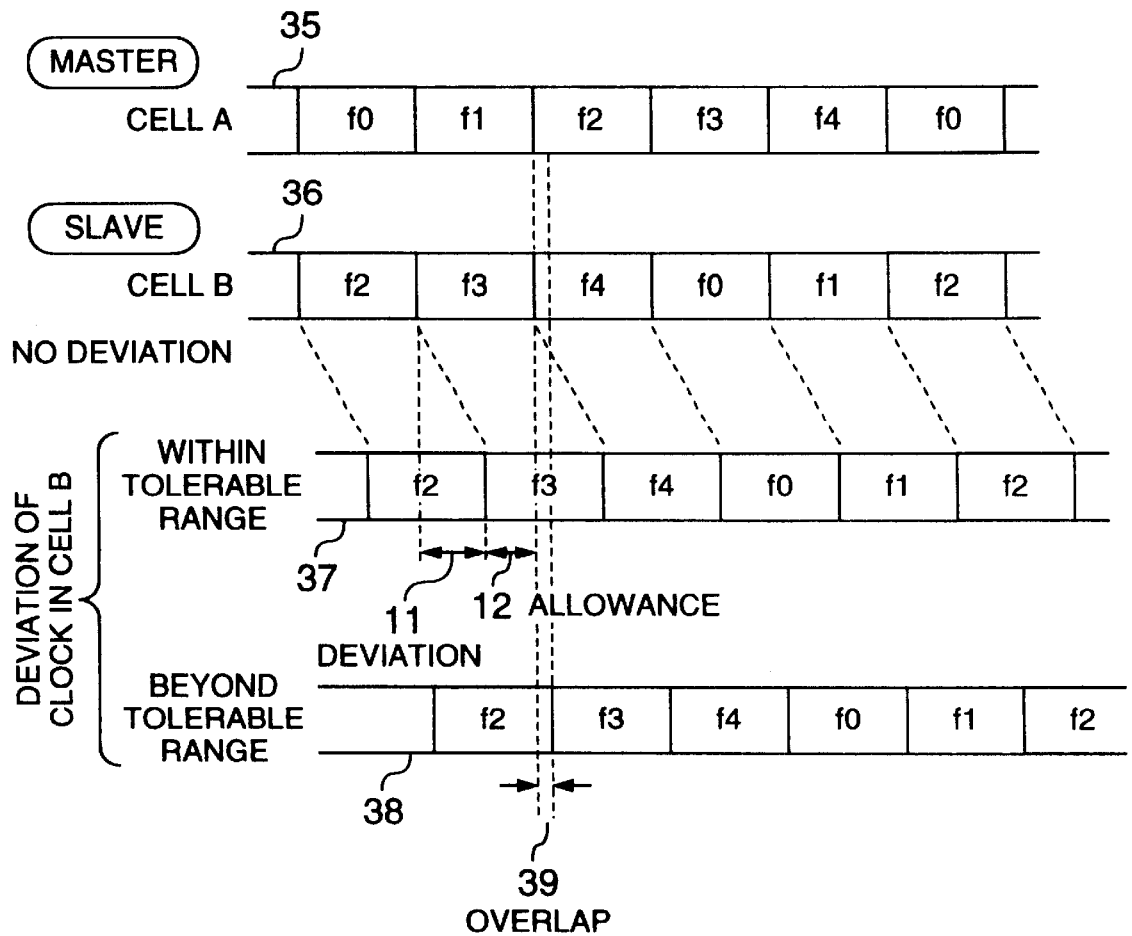
FIG. 5A illustrates a case where the hopping timing of a slave base station has a delayed phase.
Figure 5B:
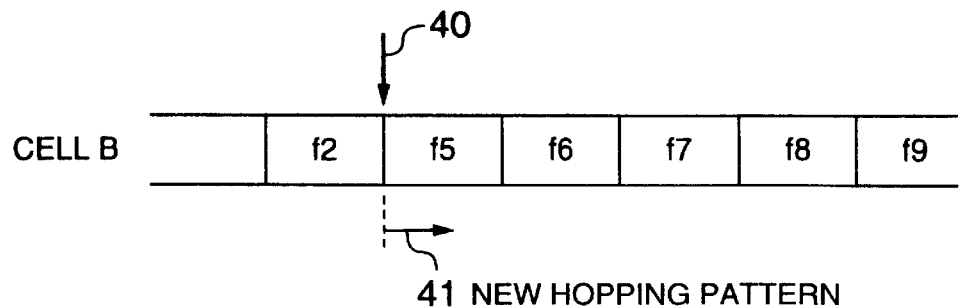
FIG. 5B is a diagram showing an embodiment of the present invention for preventing interference in the case illustrated in FIG. 5A.

FIGS. 5A and 5B show how a deviation between the clocks is eliminated when the clock of the slave base station is delayed from the clock of the master base station.

A hopping pattern 35 in FIG. 5A shows the order of the frequency hopping performed by the master base station A in the cell A, while a hopping pattern 36 shows the order of the frequency hopping performed by the slave base station B in the cell B. As can be seen from the hopping patterns 35 and 36, the timing at which the slave base station hops from one frequency to another is synchronized with the timing at which the master base station performs the frequency hopping, and no deviation is detected therebetween.

However, since the calls A and B are operating with different clocks independently of each other, the timing of one clock may gradually deviate from the timing of the other clock. A hopping pattern 37 shows that the clock of cell B is deviating, however, still within a tolerable range. A portion 11 indicates a delay amount of the clock, i.e., the deviation, and a portion 12 indicates an allowance to interference. For example, the timing at which a frequency f2 is hopped in the cell A (hopping pattern 35) is still distanced by the allowance 12 from the timing at which the frequency f2 is hopped in the cell B (hopping pattern 37), so that such a degree of deviation will not result in interference.

A hopping pattern 38 shows a case in which the clock of cell B further deviates, so that the deviation beyonds the tolerable range. Since the interval of f2 of hopping pattern 35 of cell A overlaps with the interval of f2 of hopping pattern 38 of cell B by a portion 39, the interference will occur between the cells A and B.

To solve this problem, in this embodiment, if the allowance 12 is reduced to 50% or less of its initial amount, the hopping pattern is changed from the next hopping timing to prevent the interference caused by the overlapping time slots using the same frequency. The allowance indicates a time length remaining from the time at which the timing of one clock begins to deviate from the other to the time at which time slots of the two cells using the same frequency overlap to cause interference. A specific method of calculating the allowance will be described later.

FIG. 5B shows a deviation eliminating action. As the clock of cell B is increasingly delayed to reduce the allowance to 50% or less, the frequency hopping pattern used in the cell B is replaced with a new hopping pattern 41 at the next hopping timing 40. In this way, even if the timing of the clock of the slave base station B deviates from original timing of cell B, the same hopping frequency will not be concurrently used in the different cells, thus preventing the interference.

Figure 6A:
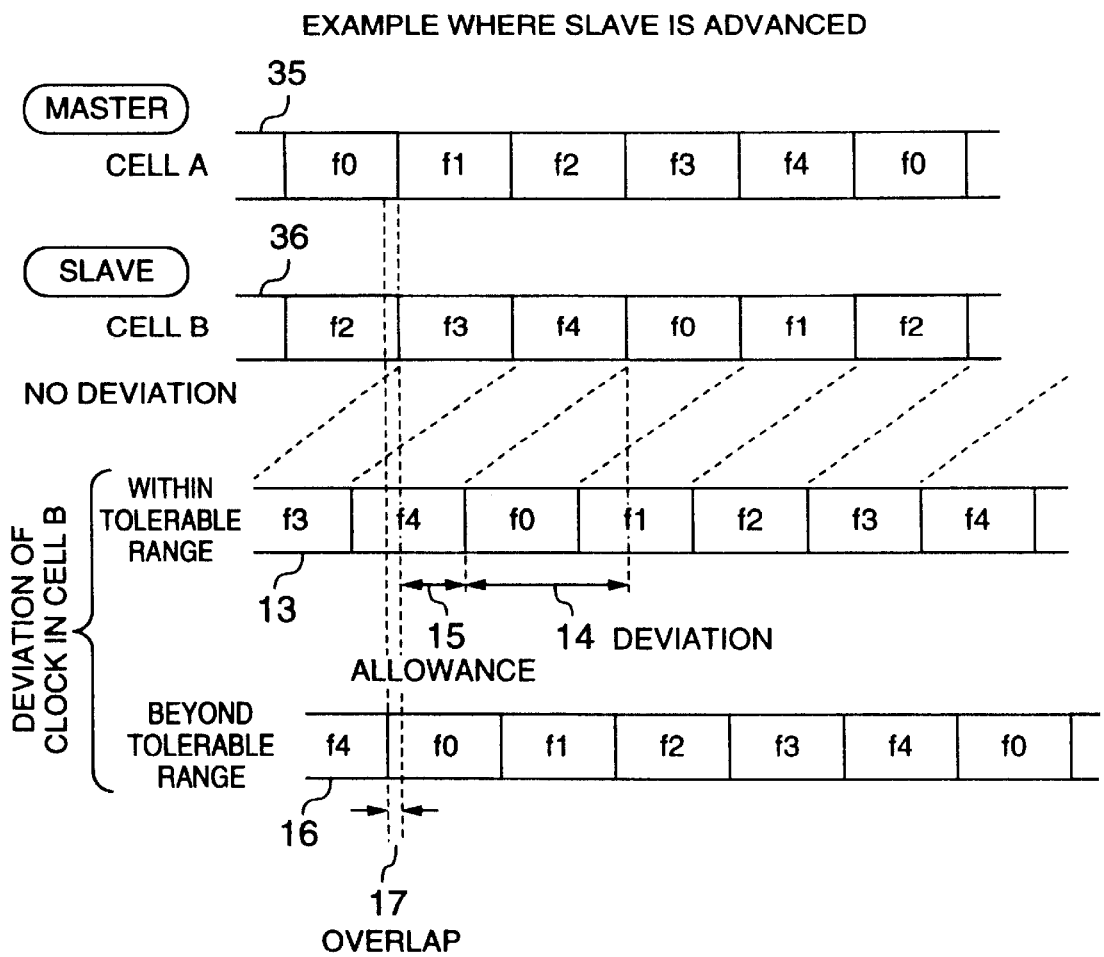
FIG. 6A illustrates a case where the hopping timing of a slave base station has an advanced phase.
Figure 6B:
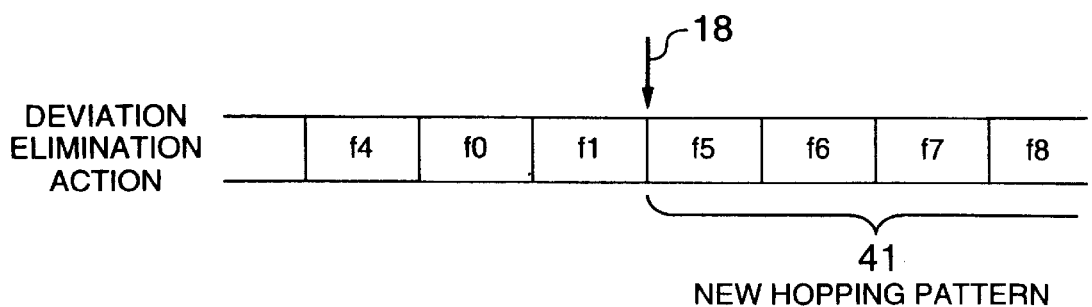
FIG. 6B is a diagram showing an embodiment of the present invention for preventing interference in the case illustrated in FIG. 6A.

FIGS. 6A and 6B show that the clock of the slave base station is advanced from the clock of the master base station. For indicating the same elements and same conditions as FIGS. 5A, 5B, the same reference numerals are used, and specific explanation thereof is omitted.

A hopping pattern 13 shows that the clock of the cell B is advanced but still within a tolerable range. A portion 14 indicates an advance amount of the clock, i.e., the deviation, and a portion 15 indicates an allowance to the interference.

A hopping pattern 16 shows a case in which the clock of the cell B further deviates, so that the deviation beyonds the tolerable range. Since the interval of clock f0 of hopping pattern 35 of cell A overlaps with the interval of clock f0 of hopping pattern 16 of cell B by a portion 17, the interference will occur between the cells A and B.

FIG. 6B shows a deviation eliminating action for the case shown in FIG. 6A. As the clock of the slave base station B in the cell B is increasingly advanced to reduce the allowance to 50% or less, the frequency hopping pattern used in the cell B is replaced with a new hopping pattern 41 at the next hopping timing 18. In this way, even if the timing of the clock of the slave base station B deviates from that of the master base station A, the same hopping frequency will not be concurrently used in the different cells, thus preventing the interference.

Figure 7A:
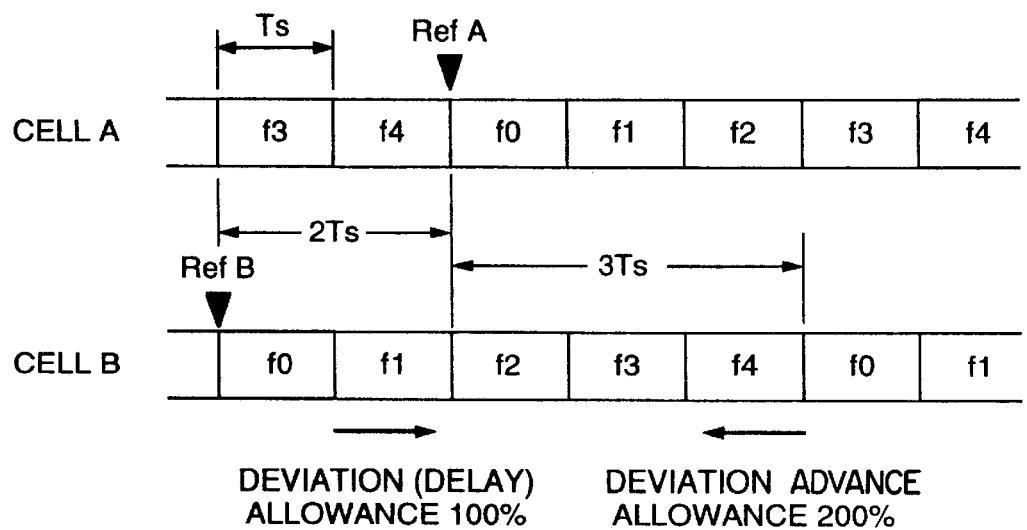
FIGS. 7A, 7B are diagrams for explaining the principles of calculating the allowance of detecting delayed and advanced phases.
Figure 7B:
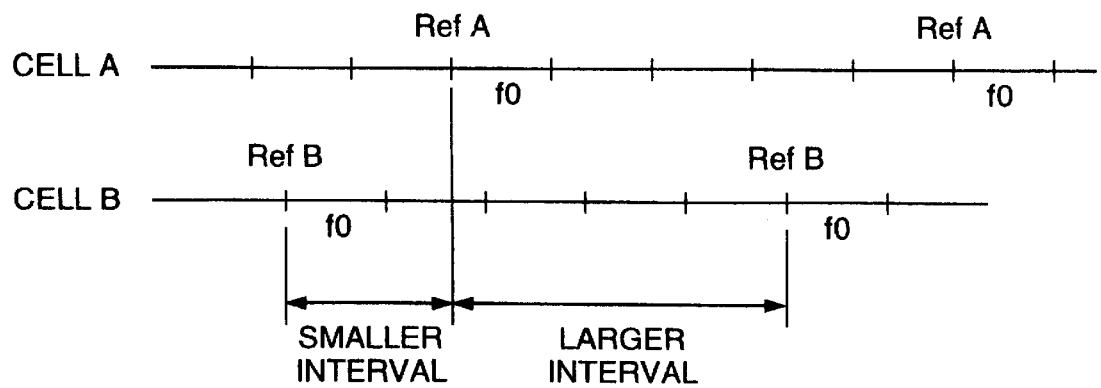

FIGS. 7A and 7B are diagrams for explaining how the allowance is calculated. In the present invention, the allowance is calculated by the following equation (1):

$$(|RefA-RefB|-Ts)/Ts \times 100 = \text{Allowance} (\%) \quad (1)$$

where RefA, RefB are reference points of the respective hopping patterns used in the cells A, B, and Ts is a unit interval of the hopping timing. For example, the start time of the first hopping pattern in a hopping sequence used in each cell A or B is measured and set to the reference point RefA or RefB. More specifically, the hopping timing of frequency f0 in the hopping pattern used in the cell B and based on the slave clock is set to RefB. Next, the hopping timing of frequency f0 of the master base station is obtained by referring to the reference clock and set to RefA.

The above-mentioned "deviation" means a deviation amount from an original phase difference between the two hopping patterns.

The original phase difference refers to a phase difference between hopping sequences which has been previously set in order to avoid the interference between the master base station and the slave base station. In the example shown in FIG. 7A, the hopping patterns for the cells A and B are determined so as to ensure a phase difference extending over 2Ts in the phase delay direction and a phase difference extending over 3Ts in the phase advance direction. At an initial stage, the allowance in the phase delay direction is 100%, while the allowance in the phase advance direction is 200%.

FIG. 7B is a diagram for explaining how to determine RefA, RefB used for calculating the allowance. Since the respective hopping patterns used in the cells A and B are repeated, an interval between the frequency f0 in the hopping pattern of the cell A and the frequency f0 in the hopping pattern of the cell B is derived as a larger interval in the phase delay direction and as a smaller interval in the phase advance direction, as shown in FIG. 7B. For calculating the allowance, the reference points RefA and RefB are sampled a plurality of times, and the combination of RefA and RefB with the smallest interval therebetween is selected and substituted into the equation (1).

At this time, how the interval between RefA and RefB is changed may be monitored over time to determine whether the phase of the hopping timing in the slave base station is delayed or advanced with respect to that in the master base station. For example, in the example shown in FIG. 7B, if the smaller interval between RefA and RefB is gradually reduced every time the measurement is made, it can be determined that the phase of the slave base station (cell B) is being delayed from that of the master base station (cell A). Conversely, if the smaller interval is gradually increased, it can be determined that the phase of the slave base station is being advanced from that of the master base station.

Figure 8A:
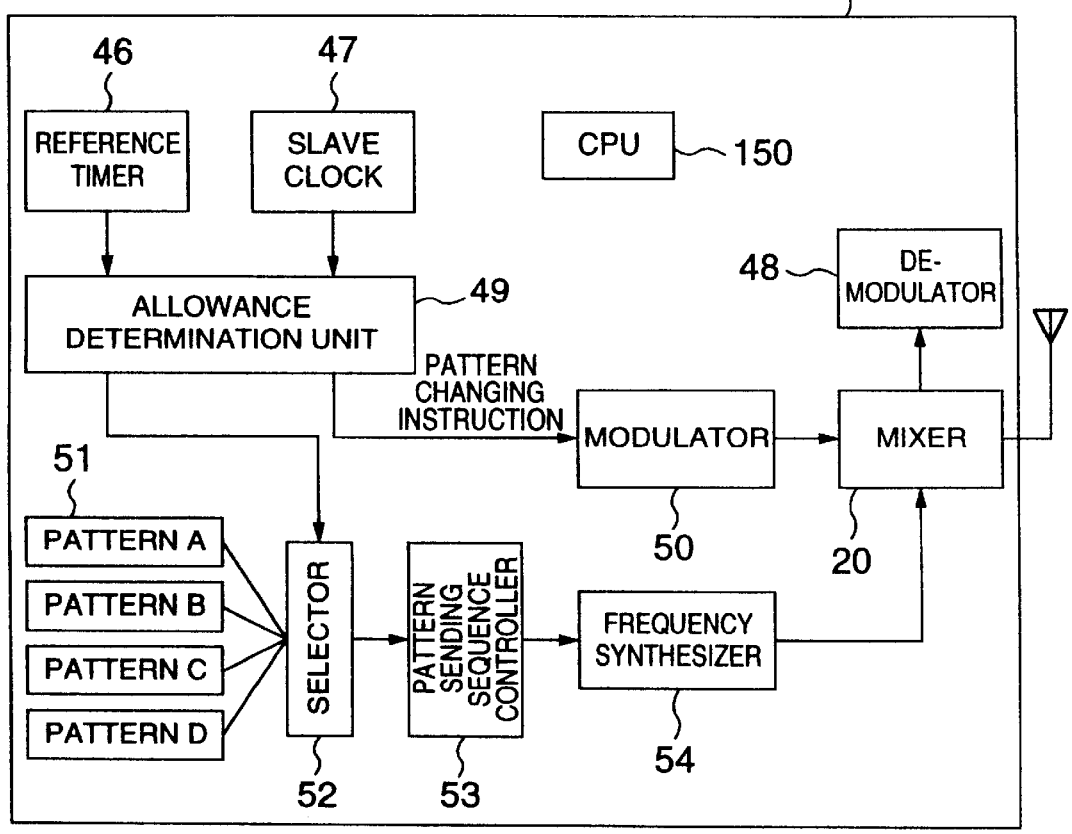
FIGS. 8A, 8B are block diagrams showing an embodiment of a base station and a radio terminal according to the present invention, respectively.
Figure 8B:
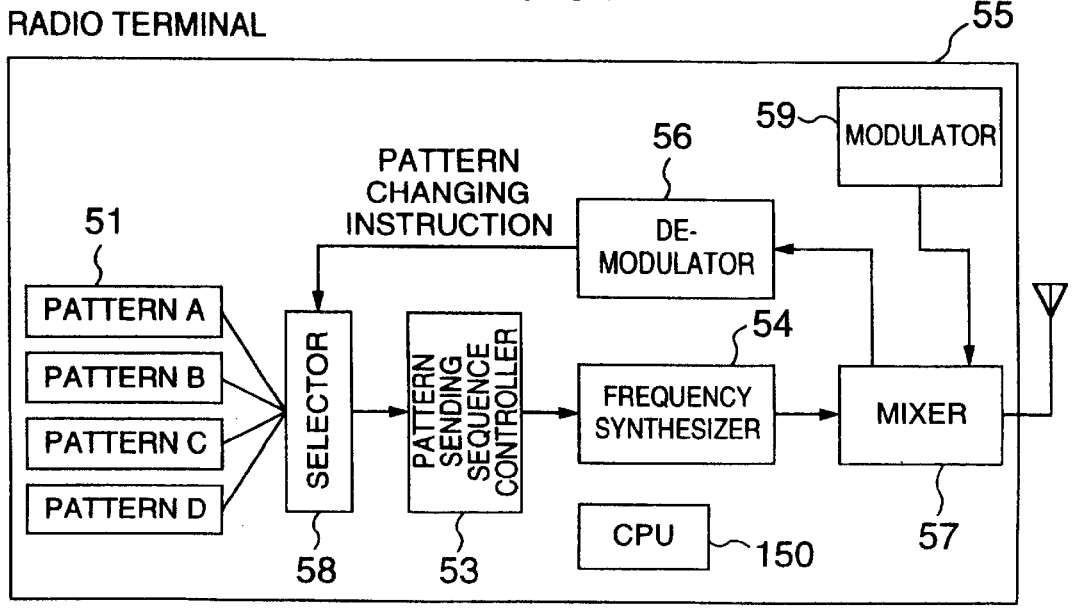

FIGS. 8A and 8B show the configuration of a base station (terminal) for realizing the synchronization between base stations according to this embodiment and the configuration of a radio terminal capable of communicating with the base station. Referring first to FIG. 8A, the base station 45 represents the configuration of a slave base station which comprises a slave clock 47 for managing the operation thereof and a reference timer 46 which is updated by a synchronization frame every time it is received from the master base station.

The timing at which the slave base station performs the frequency hopping is previously distanced by a constant hopping phase difference from a hopping sequence performed by the master base station. An allowance determination unit 49 derives the value of RefA from the value of the reference timer 46, derives the value of RefB from the value of the slave clock 47, and calculates the allowance from the foregoing allowance calculation equation (1).

If the allowance is smaller than a predetermined value (in this case, 50% or less of its initial amount), it is determined that a hopping pattern should be changed. In order to inform radio terminals belonging to the base station that the hopping pattern is to be changed, a modulator 50 is instructed to transmit a hopping pattern changing instruction contained in a hopping instruction signal. Also, a selector 52 is instructed to select a new hopping pattern from previously prepared hopping patterns 51 and passes the selected hopping pattern to a pattern sending sequence controller 53. The pattern sending sequence controller 53 controls a frequency synthesizer 54 in accordance with the new hopping pattern, whereby the frequency synthesizer 54 generates hopping frequencies based on the new hopping pattern.

Data to be transmitted is modulated by the modulator 50, mixed with a frequency generated by the frequency synthesizer 54 in a mixer 20, and then transmitted as a radio wave from an antenna.

Upon receiving data, the modulated data is demodulated in a demodulator 48. The above-mentioned sequence of operations is controlled by a CPU (central processing unit) 150 as required.

Referring next to FIG. 8B, a radio terminal 55 receives the hopping instruction signal transmitted from the base station to which it belongs, and retrieves the pattern changing instruction contained in the hopping instruction signal by a demodulator 56. A selector 58 selects a new hopping pattern specified by the pattern changing instruction from a pattern group 51, and passes the selected hopping pattern to a pattern sending sequence controller 53. The pattern sending sequence controller 53 controls a frequency synthesizer 54 in accordance with the new hopping pattern, whereby the frequency synthesizer 54 generates new received frequencies based on the new hopping pattern. By applying the frequencies are applied to a mixer 57, the data modulated to the received frequencies can be obtained in the demodulator 56.

At the data transmission, data to be transmitted is modulated by a modulator 59, mixed with a frequency generated by the frequency synthesizer 54 in the mixer 57, and transmitted as a radio wave from an antenna of the radio terminal 55. The above-mentioned sequence of operations is controlled by a CPU 150 as required.

Figure 9:
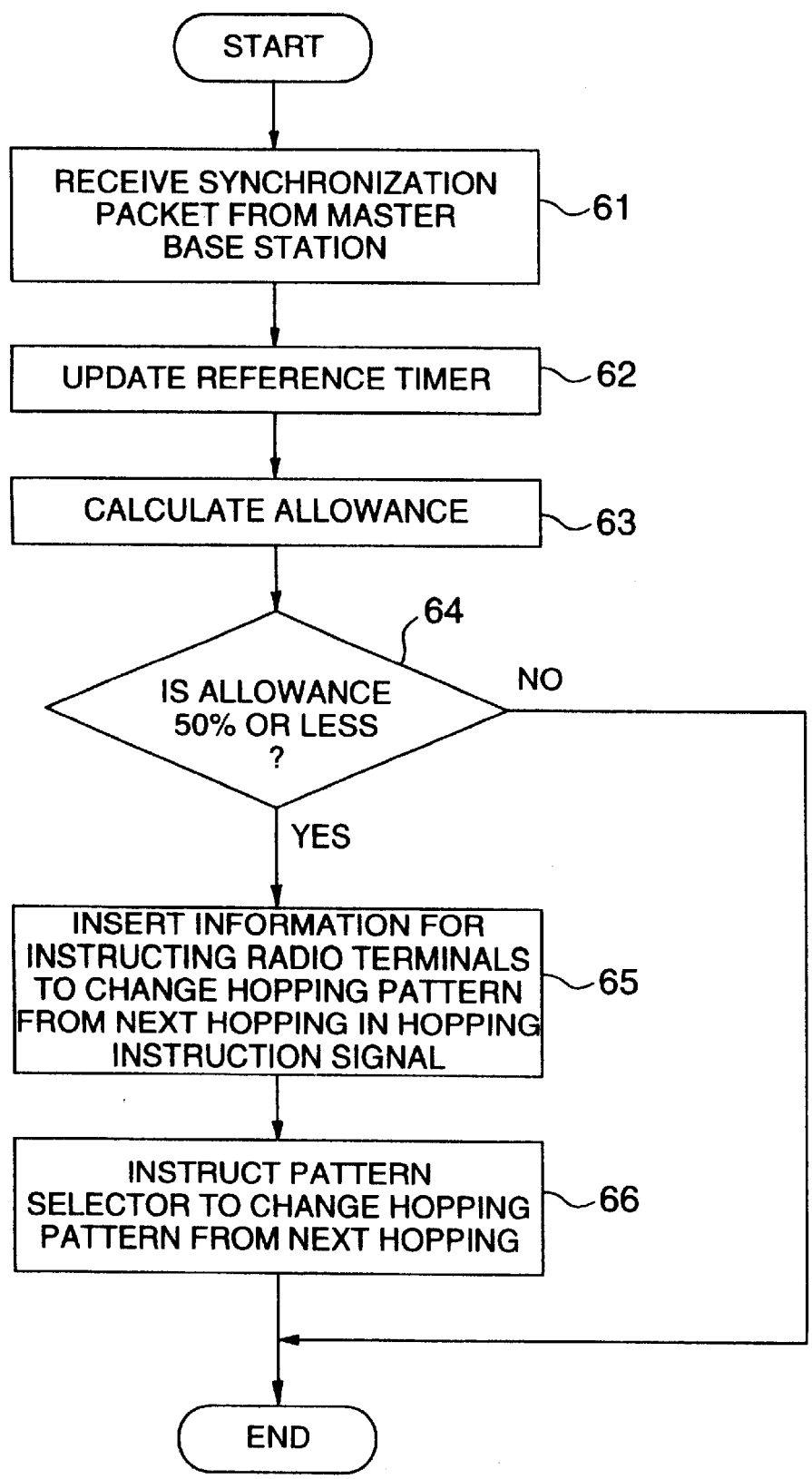
FIG. 9 is a flow chart representing an embodiment for changing a frequency hopping pattern.

FIG. 9 is a flow chart representing a procedure executed in the slave base station 45 for detecting a deviation of the clock used in the slave base station 45 from the clock used in the master base station and for instructing a change of the hopping pattern. This procedure is controlled by the CPU 150.

The slave base station 45 receives a synchronization packet from the master base station at step 61, and updates the reference timer 46 at step 62. Next, the slave base station 45 derives the value of the reference point RefA from the value of the reference timer 46, derives the value of the reference point RefB from the value of the slave clock 47, and calculates the allowance according to the foregoing equation (1) step 63.

Then, the slave base station 45 determines at step 64 whether or not the allowance is reduced to 50% or less. If the allowance has not been reduced to 50% or less, the procedure is terminated without executing any other step. On the other hand, if the allowance has been below 50%, the slave base station 45 supplies at step 65 radio terminals 55 belonging thereto with information (pattern changing instruction) indicating that the hopping pattern is changed from the next hopping. This information is contained in a hopping instruction signal and transmitted to the radio terminals 55. Then, the slave base station 45 instructs the pattern selector 52 to replace the current hopping pattern with a new one from the next hopping step 66.

Next, another embodiment of the present invention will be described. A system according to this embodiment is intended to re-establish the synchronization between master and slave base stations without losing the synchronization between each base station and radio terminals belonging thereto by skipping one hopping frequency or repeating a current hopping frequency at the next timing in the slave base station, when two clocks in the two base stations deviate from each other to come near to interference. Since the general system configuration, the basic configurations of transmitter and receiver units in the base station and the radio terminal, and the way the synchronization is established between the base stations and between the base station and radio terminals in a cell are similar to the embodiment shown in FIG. 4, repetitive explanation is omitted.

In this embodiment, if the hopping timing of a slave base station is gradually delayed from the hopping timing of the master base station as shown in FIG. 5A and the allowance is reduced to 50% or less, the hopping sequence is temporarily changed from the next hopping timing. Specifically, at the next hopping timing, the next frequency in the hopping pattern is skipped to hop to the next but one frequency on the hopping pattern. In this way, the interference is prevented.

Figure 10A:
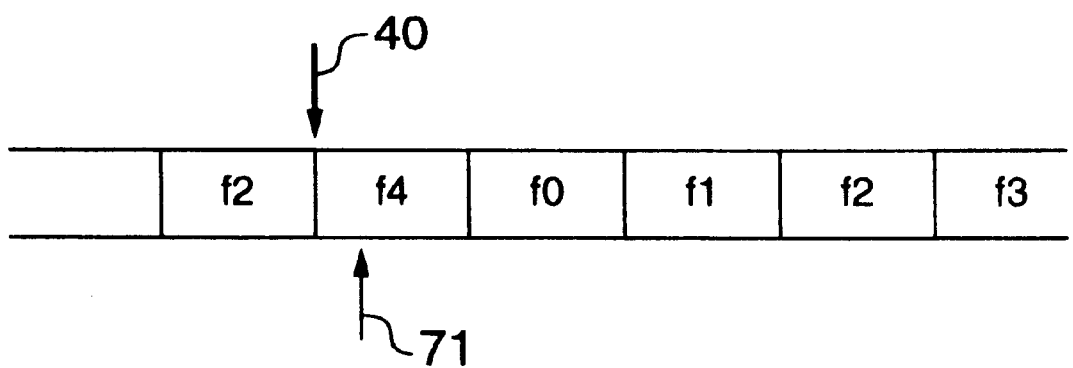
FIG. 10A is a diagram for explaining an embodiment for skipping a next hopping frequency.

FIG. 10A schematically shows the above-mentioned deviation eliminating action. If the clock of the cell B deviates so that the allowance decreases to 50% or less, a frequency f3 to be next hopped is skipped, and instead the subsequent frequency f4 is hopped at the next hopping timing 40 in the cell B, as indicated by an arrow 71. In this way, even if the clock of the slave base station B deviates, the same hopping frequency will not be concurrently used in the two cells, thus preventing interference.

Figure 10B:
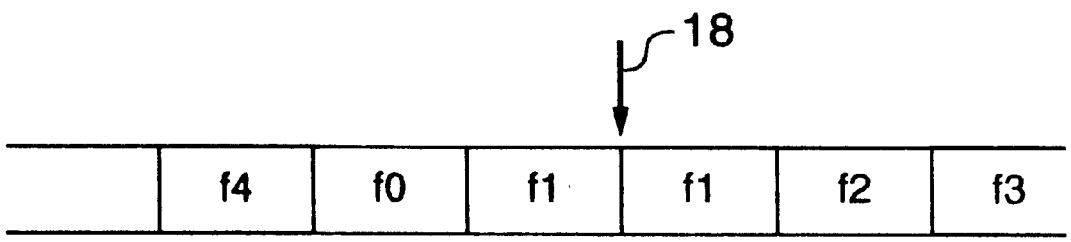
FIG. 10B is a diagram for explaining an embodiment for repeating the same hopping frequency.

Conversely, if the hopping timing of a slave base station is gradually delayed from the hopping timing of the master base station as shown in FIG. 6A and the allowance is reduced to 50% or less, in this embodiment, a current frequency f1 in a hopping pattern is used again at the next hopping timing 18, instead of hopping to the next frequency f2 in accordance with the normal hopping pattern. This operation is schematically shown in FIG. 10B. Then, from the next hopping timing, the frequency hopping is performed again in accordance with the normal hopping pattern.

Figure 11A:
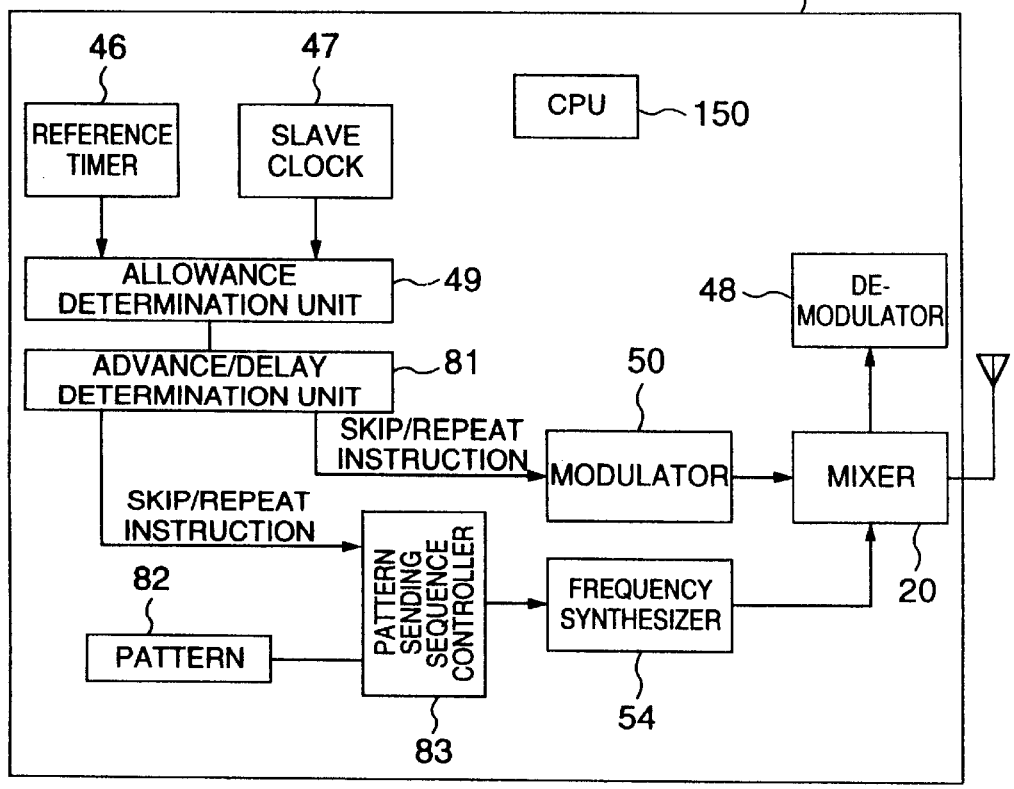
FIGS. 11A, 11B are block diagrams showing another embodiment of a base station and a radio terminal according to the present invention, respectively.
Figure 11B:
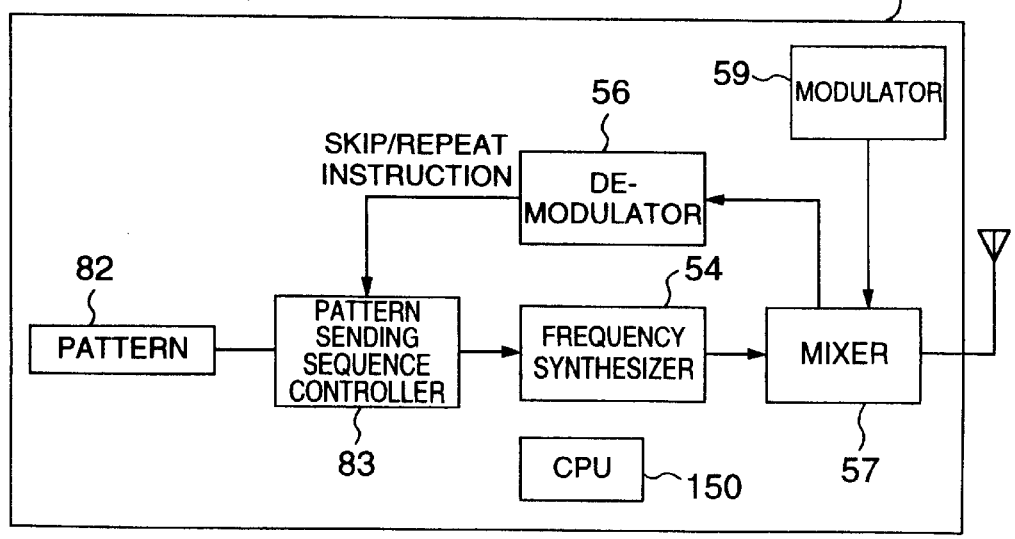

FIGS. 11A and 11B show the configuration of a base station for realizing the synchronization between base stations by the above-mentioned hopping frequency skip/repeat operation, and the configuration of a radio terminal belonging to the base station, respectively. Since the base station and the radio terminal shown in FIGS. 11A and 11B are basically identical to the base station and the radio terminal shown in FIGS. 8A and 8B, components performing the same functions are designated the same reference numerals and explanation thereof is omitted.

Referring first to the base station 77 in FIG. 11A, an advance/delay determination unit 81 monitors changes in the interval between the hopping timings of the master base station and the slave base station in accordance with the principle shown in FIGS. 7A and 7B, with respect to a hopping frequency of interest, and determines whether the hopping timing of the slave base station has an advanced or delayed phase with respect to the master base station. If the hopping timing of the slave base station has a delayed phase with the allowance reduced to 50% or less, the determination unit 81 issues a skip instruction to both a modulator 50 and a pattern sending sequence controller 83. Conversely, if the hopping timing of the slave base station has an advanced phase with the allowance reduced to 50% or less, the determination unit 81 issues a repeat instruction to the modulator 50 and the pattern sending sequence controller 83. The modulator 50 modulates the skip or repeat instruction, and the modulated instruction signal is mixed with a hopping frequency before the change in a mixer 20, and the mixed signal is transmitted to radio terminals belonging to the slave base station as a hopping instruction signal. The pattern sending sequence controller 83, in response to the skip or repeat instruction, controls a frequency synthesizer 54 to skip the next hopping frequency on the hopping pattern to use the next but one hopping frequency or to repeat a current hopping frequency without performing the frequency hopping. Thus, the frequency synthesizer 54 performs the instructed operation, i.e., skipping the next hopping frequency in the hopping pattern or repeating the current hopping frequency, to generate the hopping frequency.

The operation of the slave base station 77 when receiving data is similar to that performed by the slave base station 45 shown in FIG. 8A.

The above-mentioned sequence of operations is controlled by a CPU 150 provided in the slave base station 77 as required.

Referring next to FIG. 11B, a radio terminal 78 receives a hopping instruction signal transmitted from the base station to which it belongs, and demodulates a hopping skip/repeat instruction contained in a hopping instruction signal by a demodulator 56. A pattern sending sequence controller 83, in response to the skip or repeat instruction, performs a control for skipping one hopping frequency or repeating a current hopping frequency on a hopping pattern 82. A frequency synthesizer 54 generates the instructed frequency for the next frequency hopping.

The operation of the radio terminal 78 when receiving data is similar to that performed by the radio terminal 55 shown in FIG. 8B.

The above-mentioned sequence of operations is controlled by a CPU 150 provided in the radio terminal 77 as required.

Figure 12:
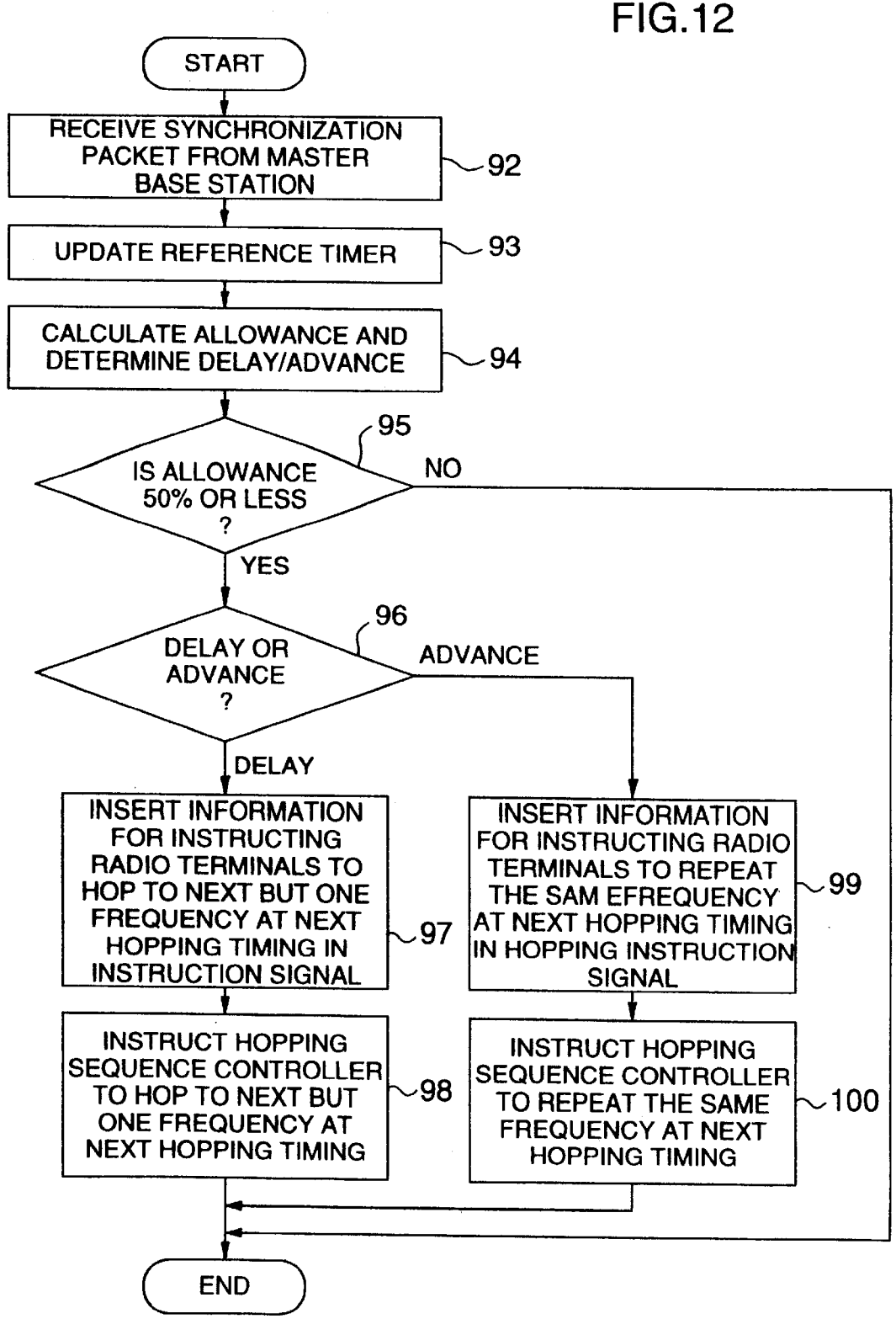
FIG. 12 is a flow chart representing a procedure for skipping a next hopping frequency or repeating the same hopping frequency in accordance with a delay or advance of the phase of the hopping timing.

FIG. 12 is a flow chart representing a procedure executed in the slave base station 77 for detecting a deviation of the clock used in the slave base station 77 from the clock used in the master base station and for instructing a hopping frequency skip operation or a hopping frequency repeat operation. This procedure is controlled by the CPU 150 in the slave base station 77.

The slave base station receives a synchronization packet from the master base station at step 92, and updates the reference timer 46 at step 93. Next, at step 94, the slave base station derives the value of the reference point RefA from the value of the reference timer 46, derives the value of the reference point RefB from the value of the slave clock 47, and calculates the allowance as well as determines whether its hopping timing is delayed or advanced with respect to the hopping timing of the master base station according to the principle shown in FIGS. 7A and 7B and the equation (1).

Then, the slave base station determines at step 95 whether or not the allowance has been reduced to 50% or less. If the allowance has not been reduced to 50% or less, the procedure is terminated without performing any other step. Conversely, if the procedure has been reduced to 50% or less, the slave base station determines at step 96 whether its hopping timing has a delayed or advanced phase with respect to the hopping timing of the master base station, and executes suitable operations in accordance with the determination at subsequent steps.

More specifically, when the hopping timing of the slave base station has a delayed phase with respect to the original timing, the slave base station transmits a hopping instruction signal containing a skip instruction to associated radio terminals at step 97. The skip instruction refers to information for instructing the radio terminals to hop to the next but one frequency at the next hopping timing. Then, at step 98, the slave base station instructs the pattern sending sequence controller 83 to hop to the next but one frequency at the next hopping timing, followed by the termination of the procedure.

On the other hand, when the hopping timing of the slave base station has an advanced phase with respect to the hopping timing of the master base station, the slave base station transmits a hopping instruction signal containing a repeat instruction to the associated radio terminals at step 99. The repeat instruction refers to information for instructing the radio terminals to repeat the same frequency, instead of hopping to the next hopping frequency, at the next hopping timing. Then, at step 100, the slave base station instructs the pattern sending sequence controller 83 to repeat the same frequency at the next hopping timing, followed by the termination of the procedure.

It should be noted that while each of the foregoing embodiments has been described in connection with the problem arising in a situation where two cells are partially overlapping with each other so that the same frequency may be concurrently hopped to in the two cells, the problem can be solved likewise by the concept similar to that described in the foregoing embodiments even when three or more cells are overlapping with each other.

Another embodiment of the present invention will be next described, wherein three or more cells are located in an overlapping relationship with each other. In this case, one of the three base stations is designated a master base station, and the remaining base stations are designated slave base stations. In the three or more overlapping cells, the base stations and their associated radio terminals are operating based on different hopping patterns so as to prevent their radio waves from interfering with each other. Alternatively, the respective slave base stations may be operating based on the same hopping pattern, but with different phase differences with respect to the master base station.

Assume here that the phases of clocks of some slave base stations are beginning to deviate from the clock of the master base station. Each of the slave base stations is provided with a reference timer which indicates the operation of the sole master base station. The reference timer utilizes a synchronization frame communicated among the base stations to always indicate correctly the operation of the clock of the master base station.

Each of the slave base stations monitors whether a predetermined phase difference between itself and the master base station is maintained using the reference timer. When the clock of a slave base station deviates to vary its predetermined phase difference, the slave base station takes a corrective action such as skipping a hopping frequency or repeating the same frequency, as shown in FIGS. 10A and 10B, so as to maintain the predetermined phase difference between itself and the master base station.

Originally, the frequency hopping operation is generally designed to prevent interference between cells covered by the slave base stations only if each slave station maintains the phase difference with the master base station at an individually predetermined value. Therefore, each of the slave base stations need not know the clock operations of other slave base stations and is only required to monitor the clock operation of the master base station.

As described above, even if three or more cells are overlapping with each other, the problem involved in the synchronization between the master base station and the other slave base stations is solved by providing each of the slave base stations with the reference timer indicating the hopping operation of the sole master base station and by controlling the hopping operations of the respective slave base stations such that they maintain the individually predetermined phase differences with the master base station.

A further embodiment of the present invention will be next described, wherein, before a base station instructs associated radio terminals to replace a hopping pattern with another one, or to skip a next hopping frequency or repeat the same frequency for the next hopping timing, such an instruction is beforehand notified to the radio terminals several times in the form of a previous notice in each command sent to the radio terminals. In this embodiment, the configurations of the base station and the radio terminals are the same as those shown in FIGS. 8A and 8B or FIGS. 11A and 11B.

The previous notification of a control instruction related to the hopping in the form of a previous notice, as will be described below in detail, may be applied to the respective embodiments described above. By notifying an instruction related to the hopping in the form of a previous notice several times, even if a certain radio terminal fails to receive the previous notice in any of the several times of the notifications, due to a communication error or the like, all radio terminals can recognize the instruction and reliably carry out an instructed change of the hopping pattern. These operations are also controlled by the CPU 150 in the respective base station and radio terminals.

Figure 13:
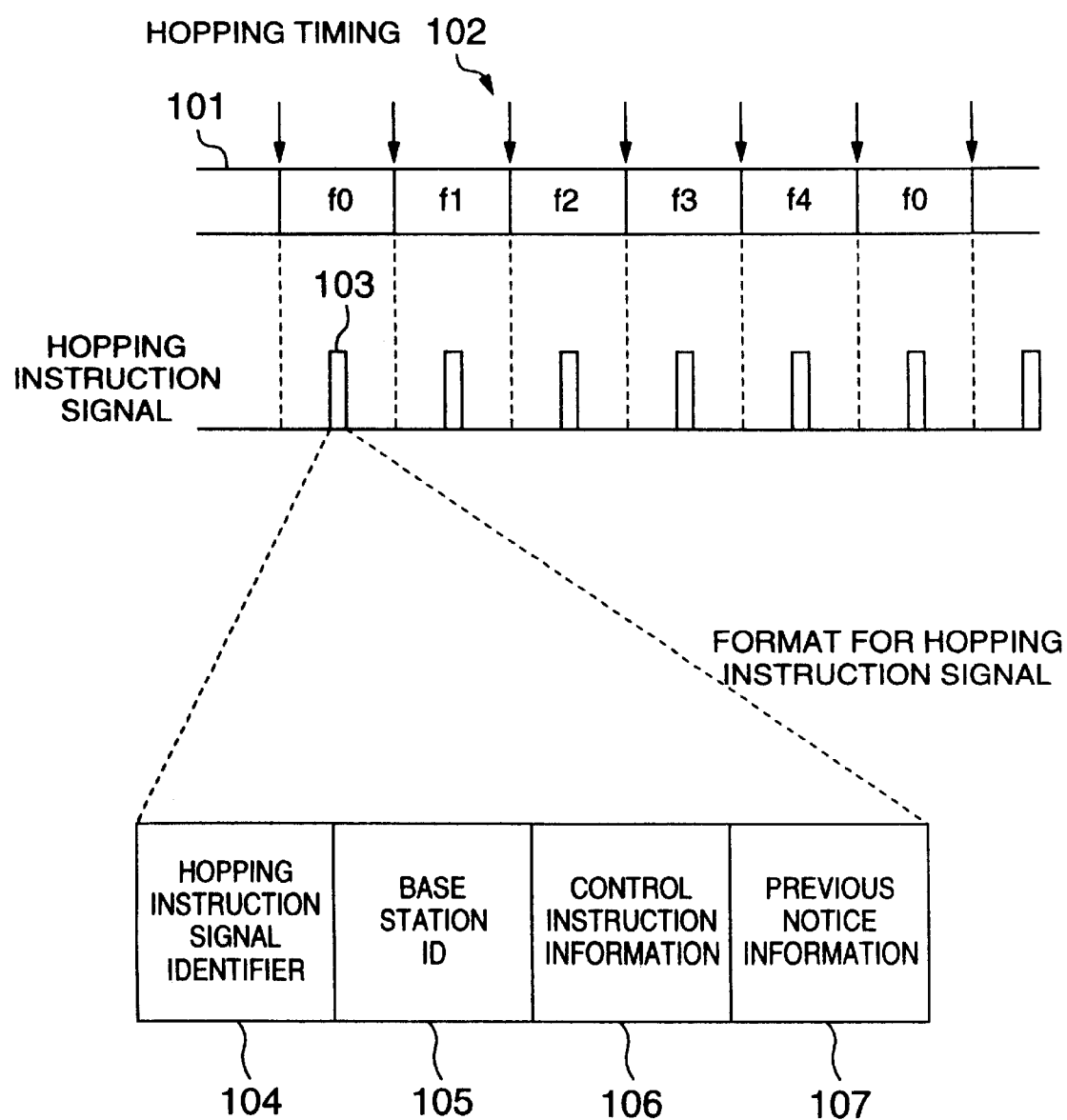
FIG. 13 is a diagram showing an embodiment for transmitting a hopping instruction signal a plurality of times.

FIG. 13 shows a hopping instruction signal used by radio terminals belonging to the same cell to perform the frequency hopping based on an instruction from an associated radio base station, a format of the hopping instruction signal, and previous notice information on an instruction to be contained in the format. A hopping pattern 101 schematically shows a frequency hopping pattern with which a base station and associated radio terminals hop from one frequency to another. The base station and the radio terminals hop to the next frequency at each hopping timing 102. To carry out the frequency hopping, the hopping instruction signal 103 is utilized. As the base station transmits the hopping instruction signal 103 at regular intervals to the radio terminals, the radio terminals perform the frequency hopping in response to the hopping instruction signal 103.

The hopping instruction signal 103 includes a hopping instruction signal identifier 104, a base station ID 105, control instruction information 106, and previous notice information 107. The hopping instruction signal identifier 104 indicates that a signal including this identifier is a hopping instruction signal. The base station ID indicates the base station which has issued this signal. The control instruction information 106 is a field for instructing the radio terminals to replace a hopping pattern, skip a hopping frequency, repeat the same hopping frequency, and so on. The previous notice information 107 indicates the number of the hopping timings existing before the control instruction information 106 becomes valid.

The contents of the previous notice information 107 are displayed such as "the control instruction information is valid after the n-th hopping timing". The previous notice information 107 is sent to the radio terminals several times as its contents are counted down. The radio terminals can know from which hopping timing the control instruction information 106 becomes valid from the previous notice information 107 included in the received hopping instruction signal, and execute the control instruction at the notified hopping timing.

Generally, the radio terminal is provided with synchronization protection, so that even if the radio terminal cannot temporarily receive a hopping instruction signal due to noise or the like, the radio terminal sequentially hops from one frequency to another in accordance with a predetermined hopping pattern based on a built-in clock for a certain time period. Therefore, the radio terminal will not lose the synchronization with the associated base station simply because the radio terminal once fails to receive the hopping instruction signal. Thus, even if noise or communication error hinders any of radio terminals from receiving the hopping instruction signal once, the radio terminals can receive subsequently transmitted hopping instruction signals, so that all the radio terminals can simultaneously execute a control instruction based on the previous notice information contained in the received hopping instruction signal, if interference is predicted.

A further embodiment of the present invention will be next described with reference to FIGS. 14 and 15. In this embodiment, when a cell including a plurality of mutually communicating radio terminals moves into the coverage area of another cell to create a multi-cell environment, this environment is detected, and a hopping pattern is changed to establish the synchronization between the two cells, thus preventing the interference.

Figure 14:
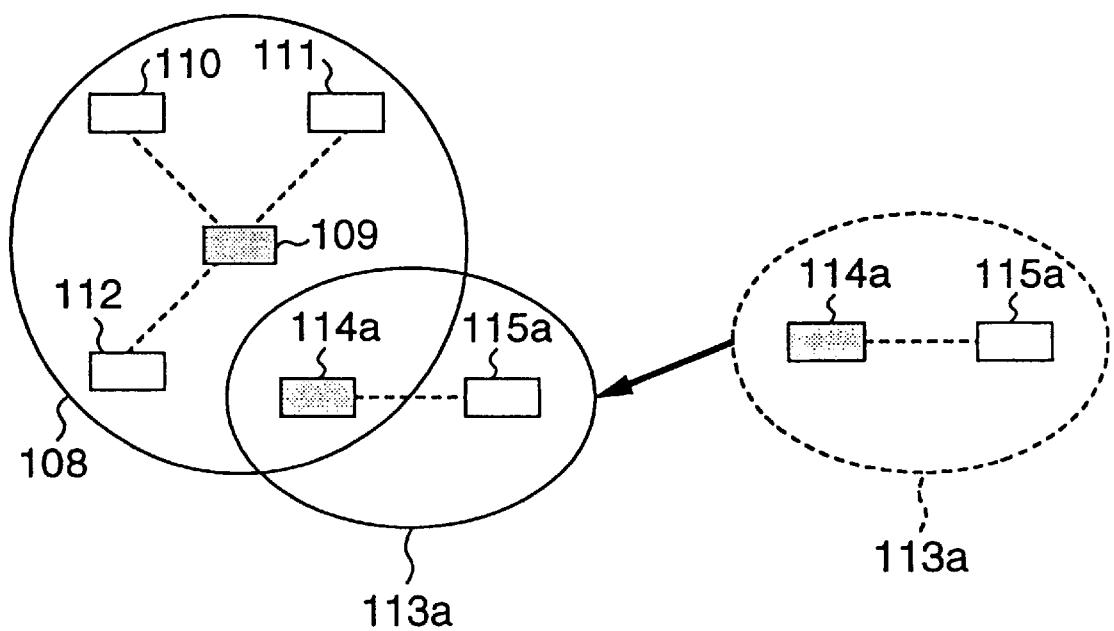
FIG. 14 is a diagram showing a case where a cell of a movable base station overlaps with a cell of a different base station.

As shown in FIG. 14, assume that there are a cell 108 including a base station 109 and radio terminals 110, 111 and 112 at a certain location and a cell 113a including a station 114a, which is capable of issuing a hopping instruction signal though it is a radio terminal, and a radio terminal 115a at another location. If the cell 113a moves toward the cell 108 and eventually overlaps with it, interference between these cells 113a and 108 is prevented by changing a hopping pattern in the following manner.

Figure 15:
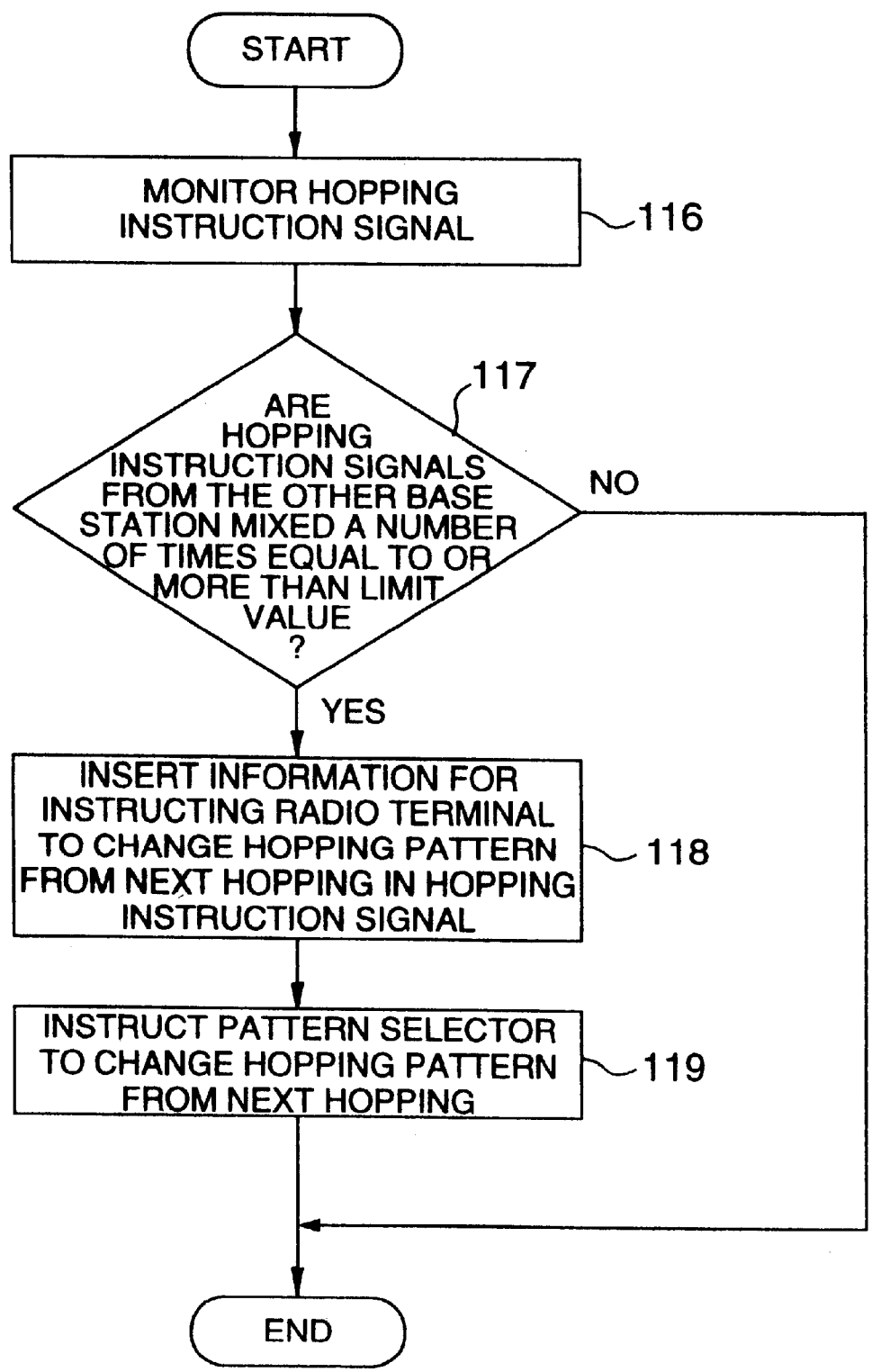
FIG. 15 is a flow chart representing an embodiment for changing a hopping pattern in the case of FIG. 14.

FIG. 15 represents in a flow chart form a procedure executed, when detecting that a moving cell has eventually overlapped with another cell, for changing a hopping pattern to establish the synchronization between the two cells, thus preventing interference therebetween. The flow chart represents processing steps executed by the station 114a which is capable of issuing a hopping instruction signal though it is a radio terminal in the moving cell.

The configurations of the base station and the radio terminal are the same as those shown in FIGS. 8A and 8B, respectively. In the following, the procedure of FIG. 15 will be explained in connection with the environment shown in FIG. 14 as an example. The station 114a capable of issuing a hopping instruction signal though it is a radio terminal, monitors the hopping instruction signal at step 116 continuously or in periodically. At step 117, the station 114a examines whether the hopping instruction signals issued by the other base station 109 are mixed in received signals a number of times equal to or more than a limit value over a predetermined time period. If not, the procedure is terminated without executing any other step. Conversely, if so, the station 114a issues at step 118 information for instructing the radio terminal 115a (included in the same cell 113a as the station 114a) to change a currently used hopping pattern from the next hopping timing, and transmits the information included in a hopping instruction signal to the radio terminal 115a. Then, at step 119, the station 114a instructs its own pattern selector to change the hopping pattern from the next hopping.

A further embodiment of the present invention will be next described with reference to FIG. 16. In this embodiment, when a cell including a plurality of mutually communicating radio terminals moves into the coverage area of another cell to create a multi-cell environment, a control is performed in the moving cell to skip one hopping frequency or repeat the same frequency at the next hopping timing, to establish the synchronization between the two cells, thus preventing the interference.

Figure 16:
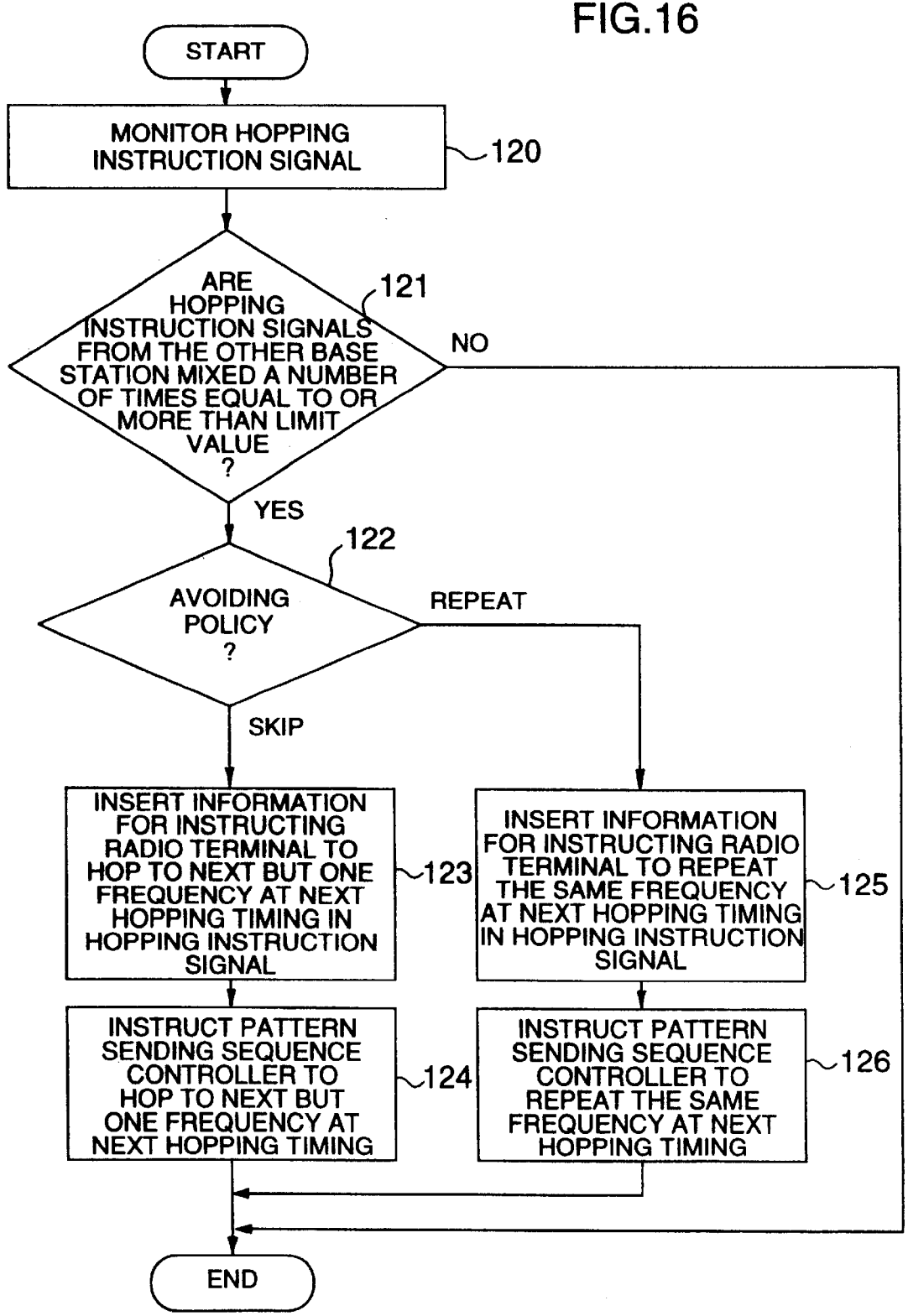
FIG. 16 is a flow chart representing an embodiment for skipping a next hopping frequency or repeating the same hopping frequency in the case of FIG. 14.

FIG. 16 represents in a flow chart form a procedure executed, when detecting that a moving cell has eventually overlapped with another cell, for skipping one hopping frequency or repeating a current hopping frequency to establish the synchronization between the two cells and thus prevent interference therebetween. The flow chart represents processing steps executed by a station which is capable of issuing a hopping instruction signal though it is a radio terminal in the moving cell.

The configurations of the base station and the radio terminal in this embodiment are the same as those shown in FIGS. 11A and 11B, respectively. In the following, the procedure of FIG. 16 will be explained in connection with the environment shown in FIG. 14 as an example. The station 114a capable of issuing a hopping instruction signal though it is a radio terminal, monitors the hopping instruction signal continuously or in periodically at step 120. At step 121, the station 114a examines whether the hopping instruction signals issued by the other base station 109 are mixed in received signals a number of times equal to or more than a limit value over a predetermined time period. If not, the procedure is terminated without executing any other step. Conversely, if so, the station 114a determines at step 122, whether one hopping frequency is skipped or the same hopping frequency is repeated, based on an interference avoiding policy. The interference avoiding policy may be previously determined as to which action to take (for example, one hopping frequency is first skipped to see whether the situation will be improved, and if interference still continues after the skipping, the previous hopping frequency is repeated, and so on).

If one hopping frequency is to be skipped, the station 114a issues information for instructing the radio terminal 115a to hop to the next but one frequency at the next hopping timing, and transmits the information contained in a hopping instruction signal to the radio terminal 115a at step 123. Then, at step 124, the station 114a instructs its own pattern sending sequence controller to hop to the next but one frequency at the next hopping timing.

On the other hand, if the same frequency is to be repeated, the station 114a issues information for instructing the radio terminal 115a to repeat the same frequency at the next hopping timing, and transmits the information contained in a hopping instruction signal to the radio terminal 115a at step 125. Then, at step 126, the station 114a instructs its own pattern sending sequence controller to repeat the same frequency at the next hopping timing.

It is to be understood that the present invention has been described in connection with several specific embodiments thereof, the present invention is not limited to the respective embodiments set forth above and that the present invention encompasses a variety of modifications falling within the scope of the appended claims.

What is claimed is:

1. A frequency hopping radio LAN system comprising:
a radio base station used in a first cell, said radio base station including:
means for detecting a deviation of a frequency hopping pattern used in the first cell from a frequency hopping pattern used in another cell, and
means for instructing a change of the frequency hopping pattern used in the first cell if the detection result indicates that said deviation is beyond a tolerable range; and
a radio terminal responsive to said instruction to use another specified frequency hopping pattern from predetermined hopping timing.

2. A radio LAN system according to claim 1, wherein said detecting means includes:
means for calculating an interval between the first cell and the other cell with respect to a predetermined hopping frequency; and
deviation amount determining means for determining whether a deviation is within or beyond the tolerable range from the value of the calculated interval.

3. A radio LAN system according to claim 2, wherein said interval calculating means includes:
first clock means operative in association with hopping timing of the other cell;
second clock means indicative of hopping timing of the first cell; and
means for calculating an interval between the hopping timing of the first cell and the hopping timing of the other cell.

4. A radio LAN system according to claim 2, wherein said deviation amount determining means includes:
means for comparing the calculated interval with a predetermined value; and
means for determining that the deviation is beyond the tolerable range if the comparison result indicates that said interval is equal to or less than said predetermined value.

5. A radio LAN system according to claim 1, wherein said instructing means includes means for previously transmitting change notice data indicative of changing timing a plurality of times.

6. A radio LAN system according to claim 1 further comprising first and second movable radio terminals.

7. A frequency hopping radio LAN system comprising:
a radio base station used in a first cell, said radio base station including:
means for detecting a deviation of a frequency hopping pattern used in the first cell from a frequency hopping pattern used in another cell, and means for instructing a change in the order of the frequency hopping pattern used in the first cell if the detection result indicates that the deviation is beyond tolerable range; and a radio terminal responsive to said instruction to select a hopping frequency from the changed frequency hopping pattern at the next hopping timing.

8. A radio LAN system according to claim 7, wherein said detecting means includes:

means for calculating an interval between the first cell and the other cell with respect to a predetermined hopping frequency; and deviation amount determining means for determining whether a deviation is within or beyond the tolerable range from the value of the calculated interval.

9. A radio LAN system according to claim 8, wherein said interval calculating means includes:

first clock means operative in association with hopping timing of the other cell;

second clock means indicative of hopping timing of the first cell; and means for calculating an interval between the hopping timing of the first cell and the hopping timing of the other cell.

10. A radio LAN system according to claim 9, wherein said instructing means includes:

phase determining means for detecting a change in said interval to determine whether the hopping timing of the first cell has a phase advanced or delayed with respect to the hopping timing of the other cell.

11. A radio LAN system according to claim 8, wherein said deviation amount determining means includes:

means for comparing the calculated interval with a predetermined value; and means for determining that the deviation is beyond the tolerable range if the comparison result indicates that said interval is equal to or less than said predetermined value.

12. A radio LAN system according to claim 7, wherein said instructing means includes means for instructing to skip a next hopping frequency to hop to the next but one hopping frequency at the next hopping timing if the hopping timing of the other cell is delayed from the hopping timing of the first cell, and for instructing to repeat the same hopping frequency at the next hopping timing if the hopping timing of the other cell is advanced from the hopping timing of the first cell.

13. A radio LAN system according to claim 12, wherein said instructing means includes:

means for calculating an interval between the hopping timing of the first cell and the hopping timing of the other cell; and phase determining means for detecting a change in said interval to determine whether the hopping timing of the first cell has a phase advanced or delayed with respect to the hopping timing of the other cell.

14. A radio LAN system according to claim 7, wherein said instructing means includes means for previously transmitting change notice data indicative of changing timing a plurality of times.

15. A radio LAN system according to claim 7 further comprising first and second movable radio terminals.

16. A frequency hopping radio LAN system comprising:
a radio base station used in a first cell, said radio base station including:

means for detecting whether at least part of a frequency hopping pattern used in the first cell matches with a frequency hopping pattern used in another cell, and means for instructing a change of the frequency hopping pattern used in the first cell if the detection result indicates that a matching degree is beyond a tolerable range; and a radio terminal responsive to said instruction to use another specified frequency hopping pattern from predetermined hopping timing.

17. A radio LAN system according to claim 16, wherein said detecting means includes means for counting a number of times a hopping signal of the other cell is received, and said instructing means includes means for instructing a change of the frequency pattern used in the first cell the counted number exceeds a predetermined value.

18. A radio LAN system according to claim 16, wherein said instructing means includes means for previously transmitting change notice data indicative of changing timing a plurality of times.

19. A radio LAN system according to claim 16 further comprising first and second movable radio terminals.

20. A frequency hopping radio LAN system comprising:
a radio base station used in a first cell, said radio base station including:

means for detecting whether at least part of a frequency hopping pattern used in the first cell matches with a frequency hopping pattern of another cell, and means for instructing a change in the order of the frequency hopping pattern used in the first cell a result of the detection indicates that a matching degree is beyond a tolerable range; and a radio terminal responsive to said instruction to select a hopping frequency from the changed frequency hopping pattern at the next hopping timing.

21. A radio LAN system according to claim 20, wherein said detecting means includes means for counting a number of times a hopping signal of the other cell is received, and said instructing means includes means for instructing a change in the order of the frequency hopping pattern if the counted number exceeds a predetermined value.

22. A radio LAN system according to claim 20, wherein said instructing means includes means for issuing an instruction to skip a next frequency to hop to the next but one hopping frequency at the next hopping timing.

23. A radio LAN system according to claim 20, wherein said instructing means includes means for issuing an instruction to repeat the same frequency at the next hopping timing.

24. A radio LAN system according to claim 20, wherein said instructing means includes means for previously transmitting change notice data indicative of changing timing a plurality of times.

25. A radio LAN system according to claim 20, further comprising first and second movable radio terminals.

26. A frequency hopping control method in a frequency hopping radio LAN system comprising the steps of:

detecting in a radio base station used in a first cell a deviation of a frequency hopping pattern used in the first cell from a frequency hopping pattern used in another cell;

instructing from said radio base station to a radio terminal capable of communicating with said radio base station to change the frequency hopping pattern used in the first cell if the detecting result indicates that said deviation is beyond a tolerable range; and performing communications using another frequency hopping pattern specified by said instruction from predetermined hopping timing.

27. A frequency hopping control method according to claim 26, wherein said detecting step includes the steps of:
   calculating an interval between hopping timing of the first cell and hopping timing of said another cell with respect to a predetermined hopping frequency; and
   determining that said deviation is beyond the tolerable range when said interval is equal to or less than a predetermined value.

28. A frequency hopping control method according to claim 26, wherein said instructing step includes the step of previously transmitting change notice data indicative of changing timing a plurality of times.

29. A frequency hopping control method in a frequency hopping radio LAN system comprising the steps of:
   detecting in a radio base station used in a first cell a deviation of a frequency hopping pattern used in the first cell covered by said radio LAN system from a frequency hopping pattern used in another cell;
   instructing from said radio base station to a radio terminal capable of communicating with said radio base station to change the order of the frequency hopping pattern used in the first cell if the detection result indicates that said deviation is beyond a tolerable range; and
   performing communications at a hopping frequency on the frequency hopping pattern which was changed as instructed from a predetermined hopping timing.

30. A frequency hopping control method according to claim 29, wherein said detecting step includes the steps of:
   calculating an interval between hopping timing of the first cell and hopping timing of another cell with respect to a predetermined hopping frequency; and
   determining that said deviation is beyond the tolerable range when said interval is equal to or less than a predetermined value.

31. A frequency hopping control method according to claim 29, wherein said instructing step includes the step of instructing to skip a next frequency to hop to the next but one hopping frequency at the next hopping timing if the hopping timing of the other cell is delayed from the hopping timing of the first cell, and to repeat the same frequency at the next hopping timing if the hopping timing of the other cell is advanced from the hopping timing of the first cell.

32. A frequency hopping control method according to claim 31, wherein said instructing step includes the steps of:
   calculating an interval between the hopping timing of the first cell and the hopping timing of the other cell with respect to a predetermined hopping frequency; and
   detecting a change in said interval to determine whether the hopping timing of the first cell has a phase advanced or delayed with respect to the hopping timing of said other cell.

33. A frequency hopping control method according to claim 29, wherein said instructing step includes the step of previously transmitting change notice data indicative of changing timing a plurality of times.

34. A frequency hopping control method in a frequency hopping radio LAN system comprising the steps of:
   detecting in a radio base station used in a first cell whether at least part of a frequency hopping pattern used in the first cell matches with a frequency hopping pattern used in another cell;
   instructing from said radio base station to a radio terminal capable of communicating with said radio base station to change the frequency hopping pattern used in the first cell if the detection result indicates that a matching degree is beyond a tolerable range; and
   performing communications using another frequency hopping pattern specified by an instruction to change from a predetermined hopping timing.

35. A frequency control method according to claim 34, wherein said detecting step includes the step of counting a number of times a hopping signal of the other cell is received, and said instructing step includes the step of instructing a change of the frequency hopping pattern used in the first cell if the counted number exceeds a predetermined value.

36. A frequency hopping control method according to claim 34, wherein said instructing step includes the step of previously transmitting change notice data indicative of changing timing a plurality of times.

37. A frequency hopping control method in a frequency hopping radio LAN system comprising the steps of:
   detecting in a radio base station used in a first cell whether at least part of a frequency hopping pattern used in the first cell matches with a frequency hopping pattern used in another cell;
   instructing from said radio base station to a radio terminal capable of communicating with said radio base station to change the order of the frequency hopping pattern used in the first cell if the detection result indicates that a matching degree is beyond a tolerable range; and
   performing communications at a hopping frequency on the changed frequency hopping pattern at the next hopping timing.

38. A frequency hopping control method according to claim 37, wherein said detecting step includes the step of counting a number of times a hopping signal of the other cell is received, and said instructing step includes the step of instructing a change in the order of the frequency hopping pattern used in the first cell if the counted number exceeds a predetermined value.

39. A frequency hopping control method according to claim 37, wherein said instructing step includes the step of instructing to once skip a next hopping frequency to hop to the next but one hopping frequency.

40. A frequency hopping control method according to claim 37, wherein said instructing step includes the step of issuing an instruction to repeat the same frequency at the next hopping timing.

41. A frequency hopping control method according to claim 37, wherein said instructing step includes the step of previously transmitting change notice data indicative of changing timing a plurality of times.

* * * * *